United States Patent
Liu et al.

(10) Patent No.: US 9,483,195 B2
(45) Date of Patent: Nov. 1, 2016

(54) RESPONSE READING METHOD AND DATA TRANSMISSION SYSTEM

(71) Applicant: PHISON ELECTRONICS CORP., Miaoli (TW)

(72) Inventors: Hsing-Chang Liu, Taipei (TW); Meng-Chang Chen, Miaoli County (TW)

(73) Assignee: PHISON ELECTROICS CORP., Miaoli (TW)

( * ) Notice: Subject to any disclaimer, the term of this patent is extended or adjusted under 35 U.S.C. 154(b) by 62 days.

(21) Appl. No.: 14/706,998

(22) Filed: May 8, 2015

(65) Prior Publication Data

US 2016/0266822 A1    Sep. 15, 2016

(30) Foreign Application Priority Data

Mar. 10, 2015   (TW) .............................. 104107591 A

(51) Int. Cl.
  *G06F 12/00*   (2006.01)
  *G06F 3/06*    (2006.01)
(52) U.S. Cl.
  CPC ............ *G06F 3/0619* (2013.01); *G06F 3/065* (2013.01); *G06F 3/0659* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 8,977,658 B2 * | 3/2015 | Meng ................ | G06F 17/30218 707/824 |
| 2009/0187709 A1 * | 7/2009 | Chen ..................... | G06K 19/07 711/115 |
| 2010/0186077 A1 * | 7/2010 | Chang ................. | G06F 12/0246 726/9 |
| 2015/0324292 A1 * | 11/2015 | Krishnaiyer ........ | G06F 12/0862 711/137 |

* cited by examiner

*Primary Examiner* — Daniel Tsui
(74) *Attorney, Agent, or Firm* — Jianq Chyun IP Office

(57) ABSTRACT

A response reading method and a data transmission system are provided. The method includes, transmitting a first operation command sequence corresponding to a first temporary file to a memory storage device by a system, where the first operation command sequence instructs a smart card to execute a first operation. The method also includes, executing a first writing operation of a first dummy file to update first data in a cache memory. The method further includes, executing a response reading operation corresponding to a second temporary file by the system to read a response of the smart card corresponding to the first operation command sequence.

20 Claims, 18 Drawing Sheets

| Logic unit | File |
|---|---|
| 610(0) | First temporary file |
| 610(1) | Second temporary file |
| 610(2) | Third temporary file |
| 610(3) | First dummy file |
| 610(4) | Second dummy file |
| ⋮ | ⋮ |

FIG. 8A

RESPONSE READING METHOD AND DATA TRANSMISSION SYSTEM

CROSS-REFERENCE TO RELATED APPLICATION

This application claims the priority benefit of Taiwan application serial no. 104107591, filed on Mar. 10, 2015. The entirety of the above-mentioned patent application is hereby incorporated by reference herein and made a part of this specification.

BACKGROUND

1. Technology Field

The present invention is directed to a response reading method and more particularly, to a response reading method adapted for a data transmission system having a host system and a memory storage device with a rewritable non-volatile memory module and a smart card.

2. Description of Related Art

As electronic wallets and pre-payments are gradually accepted by users, smart cards are widely used. The smart card is an integrated circuit chip (IC chip) having components such as a microprocessor, a card operating system, a security module and a memory for performing an operation predetermined by the owner. The smart card provides functions such as computation, encryption, bidirectional communication, and security verification, so that besides data storage, the smart card may provide a protection for the data stored therein. A subscriber identification module (SIM) card utilized in a cellular phone applying a global system for mobile communication (GSM) is an application example of the smart card. However, since the storage volume of the smart card is limited, memory cards with large volume are combined to the smart cards recently for increasing the storage volumes of the smart cards.

A memory card is a storage device and typically adopts a NAND flash memory as its storage medium. The NAND flash memory has advantages of being rewritable and erasable, and capable of retaining data stored therein even after being powered off. In addition, with the advancement of the fabrication techniques, the NAND flash memory is also provided with many other advantages, such as being small volume, having high access speed and low power consumption, etc. Generally speaking, a user can access data in a memory card through a card reader. Thus, in an application where a smart card is integrated with a memory card, data stored in the memory card and the smart card can only be read through a card reader in a contact manner. Nevertheless, along with the development of near field communication (NFC), many contactless sensing techniques, such as transit fare cards and access cards, have been broadly applied in our daily life.

However, when a host system access certain data belonging to the smart card, the host system may be incapable of directly reading data replied from the smart card, but old data in the cache memory of the host system, instead. Therefore, the development of a system and a method capable of unmistakably delivering response messages of the smart card in the application where the flash memory is integrated with the smart card is necessary.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a response reading method and a data transmission system capable of ensuring accuracy of response data received by a host system.

According to an exemplary embodiment of the present invention, a response reading method adapted for data transmission between a system and a memory storage device is provided. The system has a cache memory, the memory storage device has a smart card and a rewritable non-volatile memory module. The response reading method includes: transmitting a first operation command sequence corresponding to a first temporary file to the memory storage device by the system, wherein the first operation command sequence is configured to instruct the smart card to execute a first operation; executing a first writing operation corresponding to a first dummy file by the system, wherein the first writing operation is configured to update first data in the cache memory; and executing a response reading operation corresponding to a second temporary file by the system, wherein the response reading operation is configured to read a response of the smart card corresponding to the first operation command sequence.

According to another exemplary embodiment of the present invention, a data transmission system including a system and a memory storage device is provided. The system includes a cache memory. The memory storage device includes a connection interface unit, a memory control circuit unit, a rewritable non-volatile memory module and a smart card. The connection interface unit is configured to couple to the system. The memory control circuit unit is coupled to the connection interface unit. The rewritable non-volatile memory module and the smart card are respectively coupled to the memory control circuit unit. The system is configured to transmit a first operation command sequence corresponding to a first temporary file to the memory storage device. The first operation command sequence is configured to instruct the smart card to execute a first operation. The system is further configured to execute a first writing operation corresponding to a first dummy file, wherein the first writing operation is configured to update first data in the cache memory. The system is further configured to execute a response reading operation corresponding to a second temporary file, wherein the response reading operation is configured to read a response of the smart card corresponding to the first operation command sequence.

To sum up, the present invention, through executing the writing operations corresponding to the dummy files using different logic units, can facilitate in accelerating excluding old data from the cache memory. Thereby, a probability of the host system reading "accurate" response message from the smart card can be increased.

It may be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8A to FIG. 8I are schematic diagrams of updating a cache and reading a response according to a first exemplary embodiment of the present invention.

DESCRIPTION OF THE EMBODIMENTS

Figure 1:
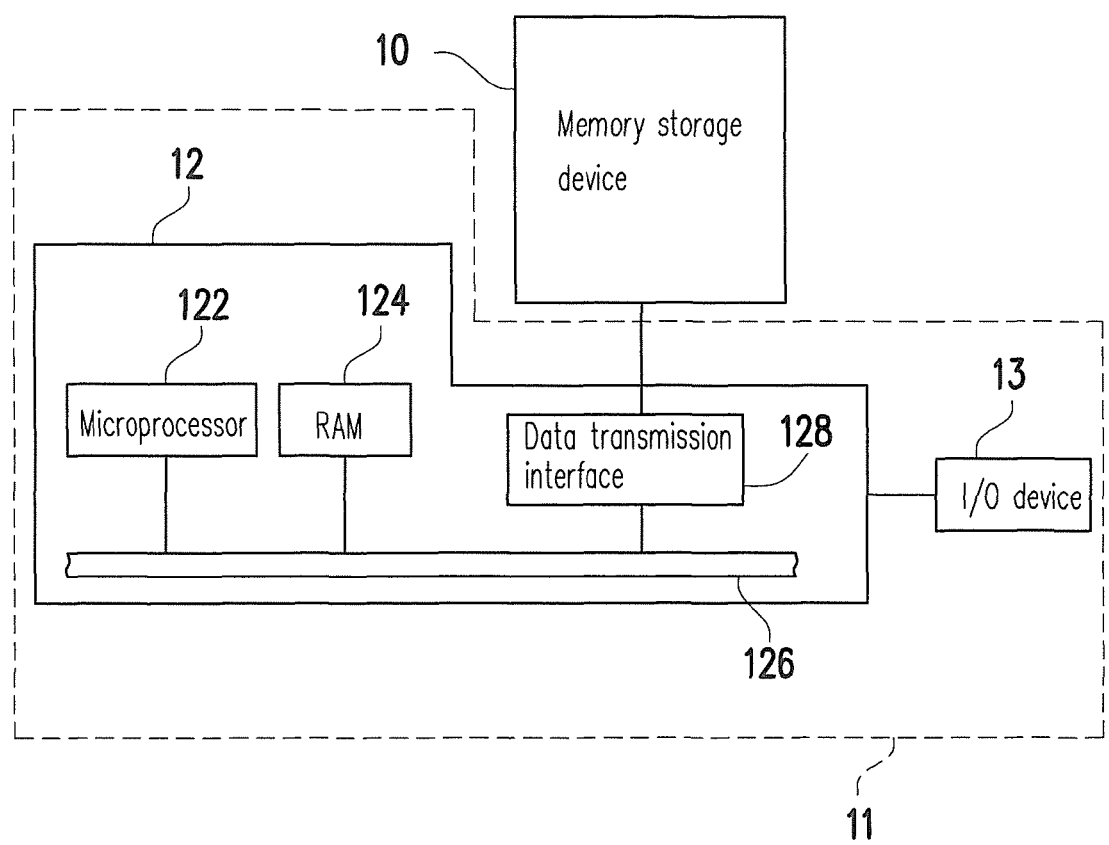
FIG. 1 is a diagram illustrating a host system and a memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage device (i.e. a memory storage system), typically, includes a rewritable non-volatile memory module and a controller (i.e., a control circuit). The memory storage device is usually used together with a host system so that the host system can write data into or read data from the memory storage device.

Figure 2:
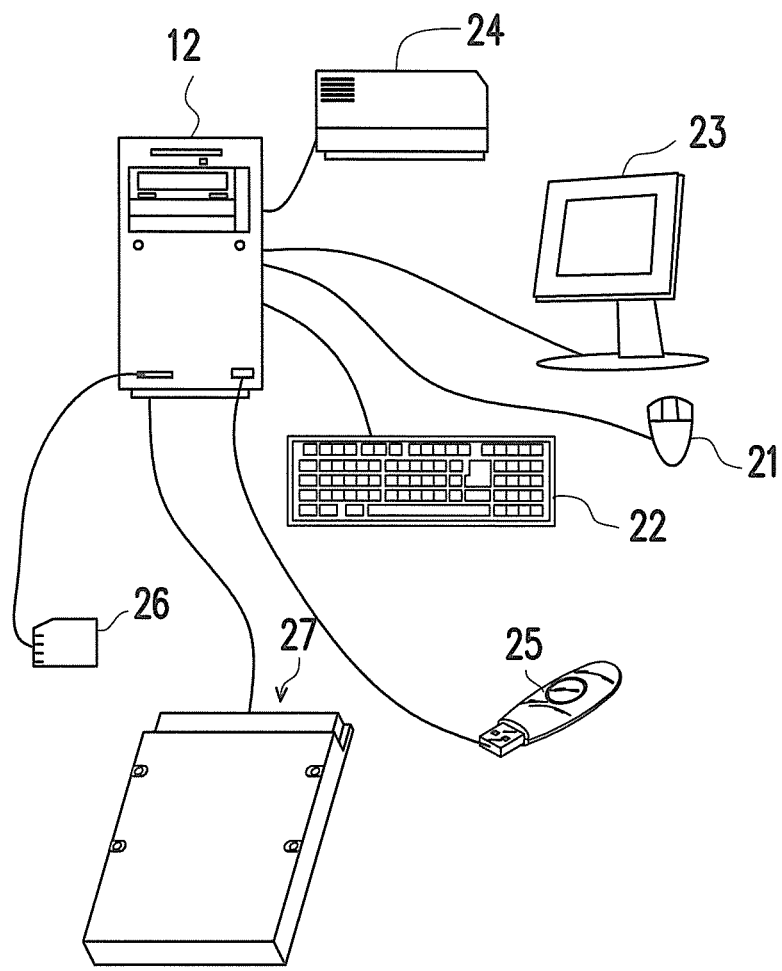
FIG. 2 is a schematic diagram of a computer, an input/output device and a memory storage device according to an exemplary embodiment of the present invention.

FIG. 1 is a diagram illustrating a host system and a memory storage device according to an exemplary embodiment of the present invention. FIG. 2 is a schematic diagram of a computer, an input/output device and a memory storage device according to an exemplary embodiment of the present invention.

Referring to FIG. 1, a host system 11 generally includes a computer 12 and an input/output (I/O) device 13. The computer 12 includes a microprocessor 122, a random access memory (RAM) 124, a system bus 126 and a data transmission interface 128. The I/O device 13 includes, for example, a mouse 21, a keyboard 22, a display 23 and a printer 24 as shown in FIG. 2. It may be noted that the devices in FIG. 2 may not be construed as limitations to the present invention, and the I/O device 13 may include other devices as well.

In the exemplary embodiment of the present invention, the memory storage device 10 is coupled to other devices of the host system 11 through the data transmission interface 128. With the operations of the microprocessor 122, the RAM 124 and the I/O device 13, data can be written into or read from the memory storage device 10. For instance, the memory storage device 10 may be a rewritable non-volatile memory storage device, such as a flash drive 25, a memory card 26, or a solid state drive (SSD) 27 as shown in FIG. 2.

Figure 3:
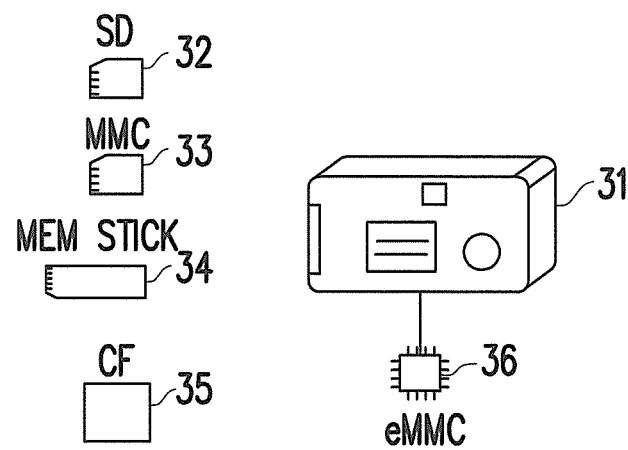
FIG. 3 is a schematic diagram of a host system and a memory storage device according to an exemplary embodiment of the present invention.

FIG. 3 is a schematic diagram of a host system and a memory storage device according to an exemplary embodiment of the present invention.

Generally, the host system 11 can substantially be any system used together with the memory storage device 10 for storing data. Even though the host system 11 is described as a computer system in the present exemplary embodiment, the host system 11, in another exemplary embodiment, may be a digital camera, a video camera, a communication device, an audio player, a video player, and so on. For instance, if the host system is a digital camera (video camera) 31, the rewritable non-volatile memory storage device is an SD card 32, an MMC card 33, a memory stick 34, a CF card 35 or an embedded storage device (as shown in FIG. 3). The embedded storage device 36 includes an embedded MMC (eMMC). It may be noted that the eMMC is directly coupled to a substrate of the host system.

Figure 4:
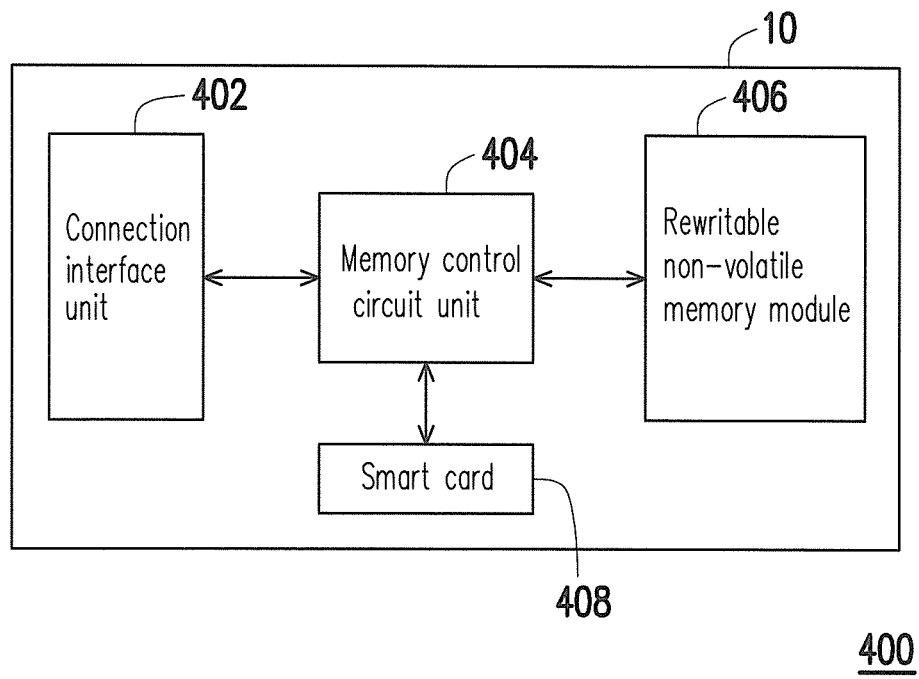
FIG. 4 is a schematic block diagram of the memory storage device depicted in FIG. 1.

FIG. 4 is a schematic block diagram of the memory storage device depicted in FIG. 1.

Referring to FIG. 4, the memory storage device 10 includes a connection interface unit 402, a memory control circuit unit 404, a rewritable non-volatile memory module 406 and a smart card 408.

The connection interface unit 402 complies with the Secure Digital (SD) interface standard. However, it may be understood that the present invention is not limited thereto, and the connection interface unit 402 may also comply with the Parallel Advanced Technology Attachment (PATA) standard, the Institute of Electrical and Electronic Engineers (IEEE) 1394 standard, the Peripheral Component Interconnect Express (PCI Express) standard, the universal serial bus (USB) standard, the Ultra High Speed-I (UHS-I) interface standard, the Ultra High Speed-II, UHS-II) (UHS-II) interface standard, the memory stick (MS) interface standard, the multi media card (MMC) interface standard, the compact flash (CF) standard, the Integrated Device Electronics (IDE) standard, or other suitable standards. In the present exemplary embodiment, the connection interface unit 402 may be packaged with the memory control circuit unit 404 or laid outside a chip including the memory control circuit unit 404.

The memory control circuit unit 404 is configured to execute a plurality of logic gates or control commands in a hardware form or in a firmware form and perform the operations such as data writing, reading or erasing in the rewritable non-volatile memory module 406 and the smart card 408 according to the command of the host system 11.

The rewritable non-volatile memory module 406 is coupled to the memory control circuit unit 404 and configured to store the data written by the host system 11. The rewritable non-volatile memory module 406 may be a single level cell (SLC) NAND flash memory module (i.e., a memory cell can store 1 bit of data), a multi level cell (MLC) NAND flash memory module (i.e., a memory cell can store 2 bits of data), a triple level cell (TLC) NAND flash memory module (i.e., a memory cell can store 3 bits of data), other flash memory module or other memory module having the same characteristic.

The smart card 408 is coupled to the memory control circuit unit 404 and configured to execute functions such as computation, encryption, bidirectional communication, and security verification. In an exemplary embodiment, the smart card 408 is a contact-type smart card chip complying with the ISO 7816 standard. Nevertheless, it may be understood that the present invention is not limited thereto. For example, the smart card 408 may also be a contact-type or non-contact-type smart card complying with ISO 14443, ISO 15408 or other secure smart card standards. In another example, the smart card 408 may be a radio frequency identification (RFID) chip, a wireless transmission chip (e.g. a Bluetooth chip), or a multimedia control chip (e.g. a digital recording chip). In addition, it is to be noted that the memory control circuit unit 404 and the smart card 408 may be two independent chips, or a single chip integrated and packaged together. In the present exemplary embodiment, the smart card 408 is configured to store sensitive data relevant to security verification, such as encryption/decryption keys, account numbers, and/or passwords. However, in another exemplary embodiment, the smart card 408 may also be applied to store normal data.

Figure 5:
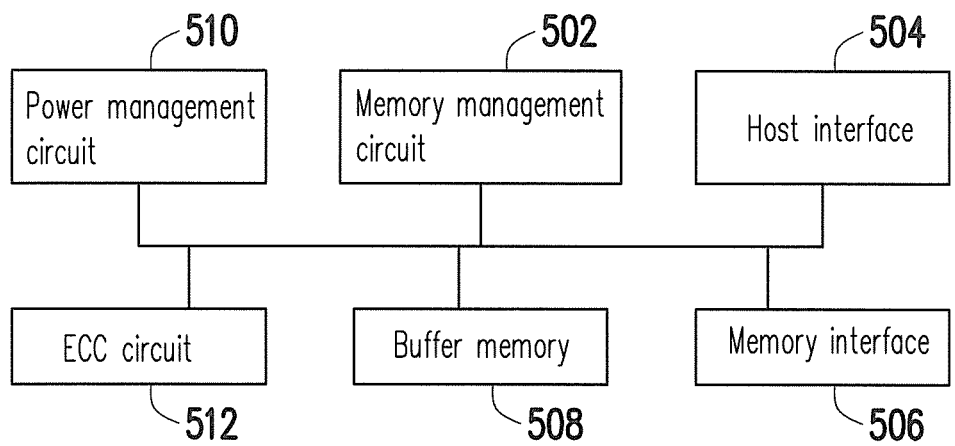
FIG. 5 is a schematic block diagram of a memory control circuit unit according to an exemplary embodiment of the present invention.

FIG. 5 is a schematic block diagram of a memory control circuit unit according to an exemplary embodiment of the present invention.

Referring to FIG. 5, the memory control circuit unit 404 includes a memory management circuit 502, a host interface 504, and a memory interface 506.

The memory management circuit 502 is configured to control the overall operation of the memory control circuit unit 404. Particularly, the memory management circuit 502 has a plurality of control commands, and when the memory storage device 10 is in operation, the control commands are executed to perform operations, such as data writing, reading, and erasing. The operations of the memory management circuit 502 will be described below, where the operations are similar to those in the memory control circuit unit 404.

In the present exemplary embodiment, the control commands of the memory management circuit 502 are implemented in a firmware form. For instance, the memory management circuit 502 has a microprocessor unit (not shown) and a read-only memory (ROM, not shown), and these control commands are burnt into the ROM. When the memory storage device 10 is in operation, the control commands are executed by the microprocessor unit to perform operations such as writing, reading, and erasing data.

In another exemplary embodiment, the control commands of the memory management circuit 502 are stored in a specific area of the rewritable non-volatile memory module 406 (for instance, a system area of the memory module exclusively used for storing system data) as program codes. Additionally, the memory management circuit 502 has a microprocessor unit (not shown), a ROM (not shown), and a RAM (not shown). In particular, the ROM has boot codes, and if the memory control circuit unit 404 is enabled, the microprocessor unit first executes the boot codes to load the control instructions from the rewritable non-volatile memory module 406 into the RAM of the memory management circuit 502. The microprocessor unit then runs the control commands to write, read, and erase data.

The host interface 504 is coupled to the memory management circuit 502 and is configured to couple to the connection interface unit 402, so as to receive and identify commands and data transmitted by the host system 11. Namely, the commands and data from the host system 11 are transmitted to the memory management circuit 502 through the host interface 504. In the present exemplary embodiment, the host interface 504 complies with the SD standard. However, the present is not limited thereto, and the host interface 504 may also comply with the PATA standard, the IEEE 1394 standard, the PCI express standard, the USB standard, the UHS-I interface standard, the UHS-II interface standard, the SATA standard, the MS standard, the MMC standard, the CF standard, the IDE standard, or any other appropriate data transmission standard.

The memory interface 506 is coupled to the memory management circuit 502 and configured to access the rewritable non-volatile memory module 406 and the smart card 408. Namely, data to be written into the rewritable non-volatile memory module 406 or into the smart card 408 may be converted by the memory interface 506 into a format acceptable to the rewritable non-volatile memory module 406 or the smart card 408. For instance, if the memory management circuit 502 is about to access the rewritable non-volatile memory module 406, the memory interface 506 transmits corresponding command sequences. The corresponding command sequences may include one or more signals or data on the bus. For instance, a reading command sequence may include information, such as reading identification codes, memory addresses.

In an exemplary embodiment of the invention, the memory control circuit unit 404 further includes a buffer memory 508, a power management circuit 510, and an error checking and correcting (ECC) circuit 512.

The buffer memory 508 is coupled to the memory management circuit 502 and configured to temporarily store data and commands received from the host system 11 or data received from the rewritable non-volatile memory module 406 or the smart card 408.

The power management circuit 510 is coupled to the memory management circuit 502 and configured to control the power supply of the memory storage device 10.

The ECC circuit 512 is coupled to the memory management circuit 502 and configured to perform an ECC procedure to ensure data accuracy. To be specific, when the memory management circuit 502 receives a writing command from the host system 11, the ECC circuit 512 generates an ECC code and/or an error detecting code (EDC), and the memory management circuit 502 writes the data, the corresponding ECC code, and/or the corresponding EDC into the rewritable non-volatile memory module 406. Subsequently, when the memory management circuit 502 reads the data from the rewritable non-volatile memory module 406, the memory management circuit 502 also reads the ECC code and/or the EDC corresponding to the data, and the ECC circuit 512 executes the ECC procedure on the read data according to the ECC code and/or the EDC.

Figure 6:
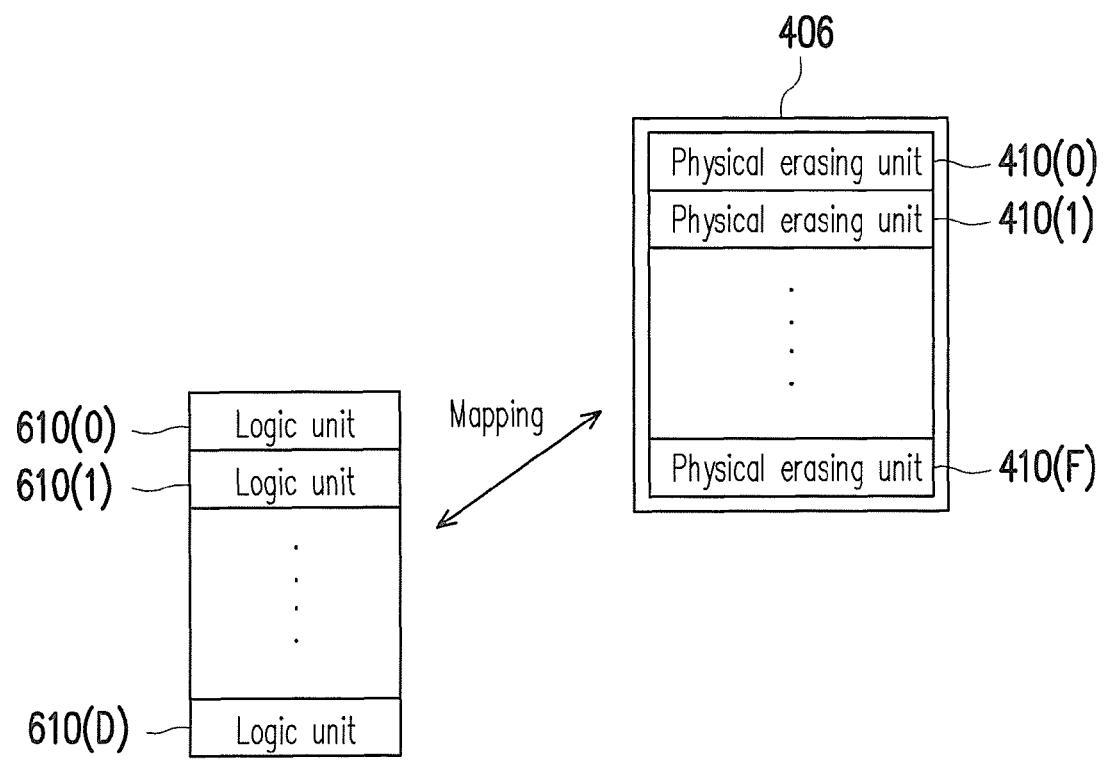
FIG. 6 is a schematic diagram of managing physical units according to an exemplary embodiment of the present invention.

FIG. 6 is a schematic diagram of managing physical units according to an exemplary embodiment of the present invention.

It may be understood that the terms used herein for describing the operations (such as "select," "group," "divide," and "associate") performed on the physical erasing units refer to a logical concept. Namely, actual positions of the physical erasing units in the rewritable non-volatile memory module 406 are unchanged, and the physical erasing units are merely logically operated.

Referring to FIG. 6, the rewritable non-volatile memory module 406 has a plurality of physical erasing units 410(1) to 410(F). The physical erasing units 410(0) to 410(F) may belong to the same memory die or belong to different memory dies. Each physical erasing unit has a plurality of physical programming units, and the physical programming units belonging to the same physical erasing unit may be written independently and erased simultaneously.

In the present exemplary embodiment, the physical programming unit is the smallest unit for programming; that is, each of the physical programming units is the smallest unit for writing data. For example, the physical programming units are physical pages or physical sectors. In case that the physical programming units are the physical pages, each of the physical programming units generally includes a data bit region and a redundant bit region. The data bit region includes a plurality of physical sectors configured to store user data, and the redundant bit region is configured to store system data (e.g., ECC codes). In the present exemplary embodiment, each data bit region contains 32 physical sectors, and the size of each physical sector is 512 bytes (512B). However, in other exemplary embodiments, the data bit region may also include 8, 16, or more or less number of the physical sectors. In another aspect, the physical erasing unit is the smallest unit for erasing data. Namely, each of the physical erasing units contains the least number of memory cells that are erased all together. For example, the physical erasing units may be physical blocks.

The memory management circuit 502 configures logical units 610(0)-610(D) to map to at least parts of the physical erasing units 410(0)-410(F). For instance, in the present exemplary embodiment, the host system 11 accesses the data stored in the physical erasing units 410(0)-410(N) through logical block addresses (LBA). Therefore, each of the logical units 610(0)-610(D) stands for one LBA. In the present exemplary embodiment, the capacity of one LBA is equal to the capacity of a logic sector. For example, the capacity of one logic sector may be 512 bytes. However, in another exemplary embodiment, the capacity of one logical unit may be greater or less than that provided herein, and each of the logical units 610(0)-610(D) may stand for one logical programming unit, one logical erasing unit, or plural consecutive LBAs. Each of the logical units 610(0)-610(D) is mapped to one or more physical units. In the present exemplary embodiment, one physical unit stands for one physical sector. However, in another exemplary embodiment, one physical unit may refer to one physical address, one physical programming unit, one physical erasing unit, or plural consecutive physical addresses, which construes no limitations to the present invention. The memory management circuit 502 may record the mapping relationship between the logical units and the physical units in one or more logical-physical mapping tables. When the host system 11 is about to read data from or write data into the memory storage device 10, the memory management circuit 502 may perform data access in the memory storage device 10 according to the one or more logical-physical mapping tables.

Figure 7:
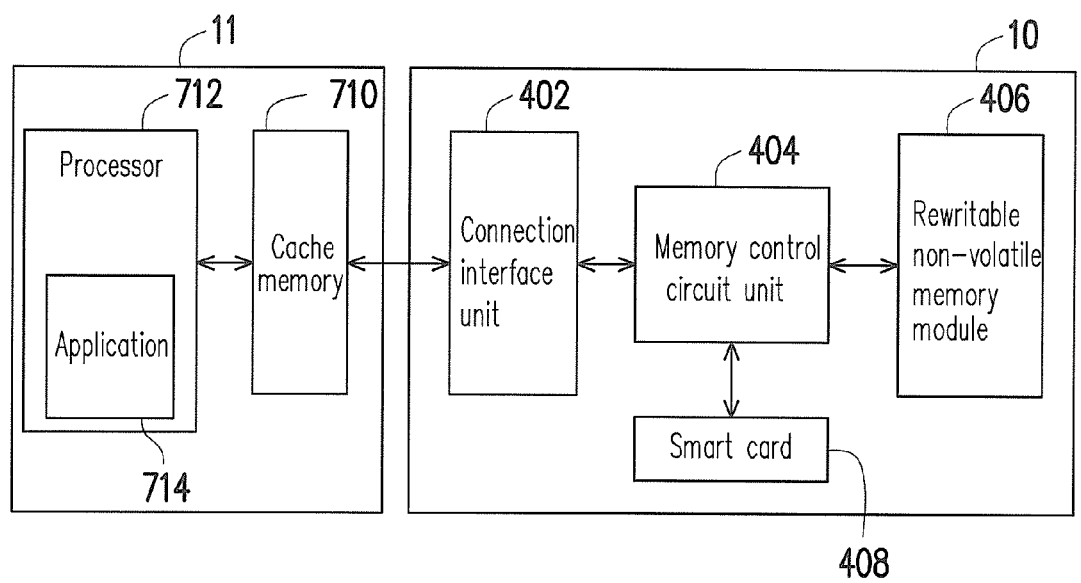
FIG. 7 is a schematic block diagram of a data transmission system according to an exemplary embodiment of the present invention.

FIG. 7 is a schematic block diagram of a data transmission system according to an exemplary embodiment of the present invention.

A data transmission system 700 includes a memory storage device 10 and a host system 11. The host system 11 includes a cache memory 710 and a processor 712.

The cache memory 710 is configured to temporarily store data that is recently used by the host system 11. The cache memory 710 is, for example, a random access memory. For instance, when data belonging to a specific logic unit is transmitted from the memory storage device 10 to the host system 11, the data is temporarily stored in the cache memory 710. Thereafter, if the host system 11 again needs to use the data belonging to the logic unit and the data is still existing in the cache memory 710, the data may be rapidly read from the cache memory 710. In this way, the host system 11 does not need to read the same data from the memory storage device 10 which spends additional time and system resource.

The processor 712 is coupled to the cache memory 710. The processor 712 is in charge of the overall operation of the host system 11. The processor 712 is, for example, a central processing unit (CPU). The processor 712 runs an application 714. For instance, the application 714 may include various types of applications, such as an instant messaging application, an SMS application, a phone call application or a security verification application, which is not limited to those listed above. Additionally, the host system 11 may also run one or more operating systems (OS) and run the application 714 based on the OS. The OS may be an Android OS or any other type/version of OS.

In the present exemplary embodiment, the host system 11 (or the application 714) accesses the smart card 408 through one or more temporary files. The temporary files may be established statically or dynamically. For instance, in a file system of the host system 11, a file location and/or an access right of a dynamically established temporary file (also referred to as a dynamic temporary file) and a file location and/or an access right of a normal temporary file (also referred to as static temporary file) established by the OS may not be the same. For instance, a file location of a dynamic temporary file may be located under a preset directory/path belonging to the application 714, and a file location of a static temporary file may be located under a root directory or an arbitrary default directory. Generally speaking, both the dynamic temporary file and the static temporary file can be accessed by the application 714. However, in some specific OSs (e.g., Android 4.4.2), due to the setting of the access right, the application 714 is capable of merely dynamically establishing a temporary file but incapable of accessing a pre-established static temporary file. Each temporary file occupies N logic units, where N is an arbitrary positive integer. The size of each temporary file may be adjusted depending on actual demands. The host system 11 (or the application 714) may execute a data access operation on the smart card 408 through accessing a logic unit belonging to a specific temporary file.

The host system 11 (or the application 714) operates the smart card 408 through a special operation command. For instance, the special operation command includes a command-application protocol data unit (C-APDU) complying with the ISO 7816 standard. For instance, when the application 714 is about to operates the smart card 408, the host system 11 (or the application 714) generates a special operation command. The special operation command is temporarily stored in the cache memory 710 and transmitted to the memory storage device 10. The memory management circuit 502 identifies the special operation command and instructs the smart card 408 to execute an access operation corresponding to the special operation command. After finishing the access operation corresponding to the special operation command, the smart card 408 transmits a response corresponding to the special operation command to the memory management circuit 502. The response is configured to notify the host system 11 of an operation result corresponding to the special operation command. For instance, the response may include a response-application protocol data unit (R-APDU) complying with the ISO 7816 standard. On the other hand, after transmitting the special operation command, the host system 11 (or the application 714) executes a response reading operation attempting to read the response corresponding to the special operation command.

Generally speaking, in the response reading operation, the application 714 instructs the host system 11 to read a specific response. In response to the instruction of the application 714, the host system 11 attempts to read a response from the cache memory 710. The host system 11, if being incapable of reading the response from the cache memory 710, transmits a read command to the memory storage device 10 to read the response from the smart card 408. For instance, the host system 11 may attempt to read data belonging to a specific temporary file from the cache memory 710. If being incapable of read the required data from the cache memory 710, the host system 11 transmits a read command (also referred to as response read command) to the memory storage device 10. The response read command is configured to, for example, instruct to read data belonging to a specific logic unit of a specific temporary file. After receiving the response read command, the memory management circuit 502 identifies the response read command and transmits a response from the smart card 408 to the host system 11 according to the response read command. When being received by the host system 11, the response is temporarily stored in the cache memory 710 and transmitted to the application 714. However, in the response reading operation, if the host system 11 is capable of directly reading the data belonging to a specific temporary file (i.e., without transmitting the response read command) from the cache memory 710, the host system 11 may probably consider the data as the response generated by the smart card 408 according to the previously issued special operation command and transmit the response to the application 714, no matter whether the data is the response "actually" to be read by the application 714. The application 714 may perform verification on the response, so as to determine whether the received response is an accurate response. If the received response is not the accurate response, the application 714 may again instruct the host system 11 to execute another response reading operation. For instance, in another response reading operation, the host system 11 may read data belonging to a subsequent temporary file. The more "old" responses stored in the cache memory 710, the greater probability that the host system 11 directly reads the "old" responses from the cache memory 710, and as a result, the host system 11 has to execute the response reading operation for many times to get the response that is "actually" to be read by the application 714. In some examples, the host system 11 may even be completely incapable of getting the response that is "actually" to be read by the application 714.

Generally speaking, data recorded in the cache memory 710 is stored based on the logic unit to which the data belongs. For instance, the cache memory 710 may be divided into a plurality of cache regions. For example, referring to FIG. 8B, the cache memory 710 may be divided into cache region 710(0) to 710(M). The capacity of each cache region is, for example, equal to the capacity of one logic unit and may be configured to store data belonging to a specific logic unit. Additionally, the capacity of each cache region may be larger or smaller. In the previous exemplary embodiment, it is assumed that the current cache memory 710 records a special operation command (also referred to as an "old" special operation command) issued by the application 714 corresponding to a specific logic unit and a response (also referred to as an "old" response) issued by the smart card 407 corresponding to the "old" special operation command. If the application 714 executes another access operation corresponding to the smart card 407, and then another special operation command (also referred to as a "new" special operation command) corresponding to the access operation is also temporarily stored in the cache memory 710. Afterwards, when the application 714 is about to read a response (also referred to as a "new" response) corresponding to the "new" special operation command, the "old" response may be read from the cache memory 710 and transmitted to the application 714. In other words, according to a normal caching mechanism for the cache memory 710, when the application 714 requests to read a "new" response corresponding to a specific "new" special operation command, the application 714 may read the "old" response if the "old" response belonging to a specific logic unit of a specific temporary file is not cleared or overwritten. Thus, a scenario that the "new" response requires more time to be read or even cannot be read may occur due to too many "old" responses stored in the cache memory 710.

In the exemplary embodiment below, the host system 11 (or the application 714) executes a writing operation corresponding to one or more dummy files to update the data in the cache memory 710 to attempt to clear or overwrite the "old" responses that may exist in the cache memory 710. Each dummy file occupies P logic units, where P is an arbitrary positive integer. The size of each dummy file may be adjusted depending on actual demands. In particular, the dummy files referred to herein are not equivalent to the temporary files described above. For instance, through executing a writing operation corresponding to a dummy file, the host system 11 (or the application 714) may write data into a logic unit belonging to the dummy file, so as to update the data in the cache memory 710. In the present exemplary embodiment, data used to be written into the dummy file is invalid data (or dummy data). However, in another exemplary embodiment, the data used to be written into the dummy file may also be valid data (or actual data). Additionally, the host system 11 (or the application 714) may obtain an update status of the cache memory 710 through executing a reading operation corresponding to a dummy file. For instance, according to the update status of the cache memory 710, the host system 11 (or the application 714) may determine whether to continuously execute the writing operation corresponding to other dummy files. In other words, in the present exemplary embodiment, the configuration of the dummy files is only used to update the data temporarily stored in the cache memory 710, not provided with other functions. However, in another exemplary embodiment, the dummy files may also be configured to operate the smart card 408 or access the data in the rewritable non-volatile memory module 406. It is to be mentioned that a time point of performing the writing operation corresponding to a dummy file may be before a specific special operation command is transmitted, before a response corresponding to a specific special operation command is read and after a specific special operation command is transmitted, or any time point, which is not limited in the present invention. Through executing the writing operation corresponding to the dummy file before the response of the smart card 408 is read, the probability of reading the "old" response can be reduced.

First Exemplary Embodiment

FIG. 8A to FIG. 8I are schematic diagrams of updating a cache and reading a response according to a first exemplary embodiment of the present invention.

Referring to FIG. 8A, it is assumed that a first temporary file is configured in the logic unit 610(0), a second temporary file is configured in the logic unit 610(1), a third temporary file is configured in the logic unit 610(2), a first dummy file is configured in the logic unit 610(3), and a second dummy file is configured in the logic unit 610(4). Such corresponding relationship may be recorded in any form in the file system used by the host system 11. For instance, the file system may be a file allocation table (FAT) file system, a new technology file system (NTFS) file system, a high performance file system (HPFS) file system or any other type of management file system. The corresponding relationship between each temporary file and each logic unit or between each dummy file and each logic unit may be configured immediately when a temporary file or a dummy file is established, or may be configured in advance before the temporary files or dummy files are established, which is not limited in the present invention. During the user's operation, as files in the file system may be deleted or moved, the corresponding relationship between each temporary file and each logic unit or between each dummy file and each logic unit may also be changed. The corresponding relationship between more or fewer temporary files and/or dummy files and the logic units may also be recorded in the file system used by the host system 11. Additionally, even though it is assumed that the size of one temporary file is equal to the capacity of one logic unit, and the size of one dummy file is equal to the capacity of one logic unit in the present exemplary embodiment, in another exemplary embodiment, the size of each temporary file and the size of each dummy file may be greater or smaller. For instance, in another exemplary embodiment, the logic units 610(0)-610(2) may also belong to the same temporary file. It may be noted that the reading operation/writing operation executed by the host system 11 (or the application 714) corresponding to a specific file below refers to the operation that the host system 11 (or the application 714) reads data stored in the logic unit corresponding to the file, or write data into the logic unit.

Figure 8B:
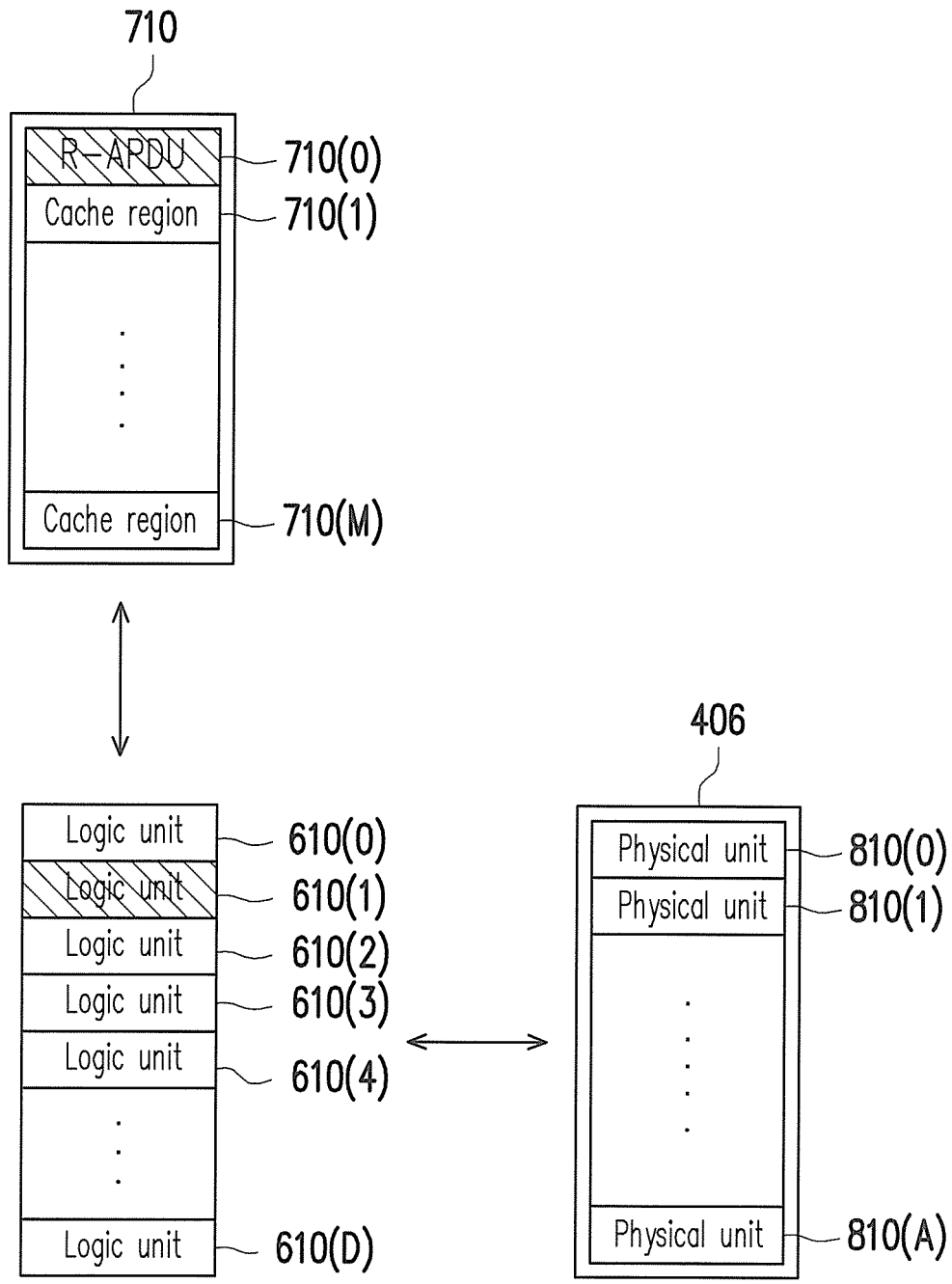

Referring to FIG. 8B, the rewritable non-volatile memory module 406 includes physical units 810(0)-810(A). Each of the physical units 810(0)-810(A) is mapped to one of the logic units 610(0)-610(D), for example. Detail with respect to information, such as the size of a physical unit, has been described above and will not be repeated here. Additionally, it is assumed that the cache region 710(0) stores data with respect to the "old" response belonging to the logic unit 610(1). The "old" response is, for example, generated by the smart card 408 according to the "old" special operation command and received, by the host system 11, from the memory storage device 10 by reading the logic unit 610(1).

Figure 8C:
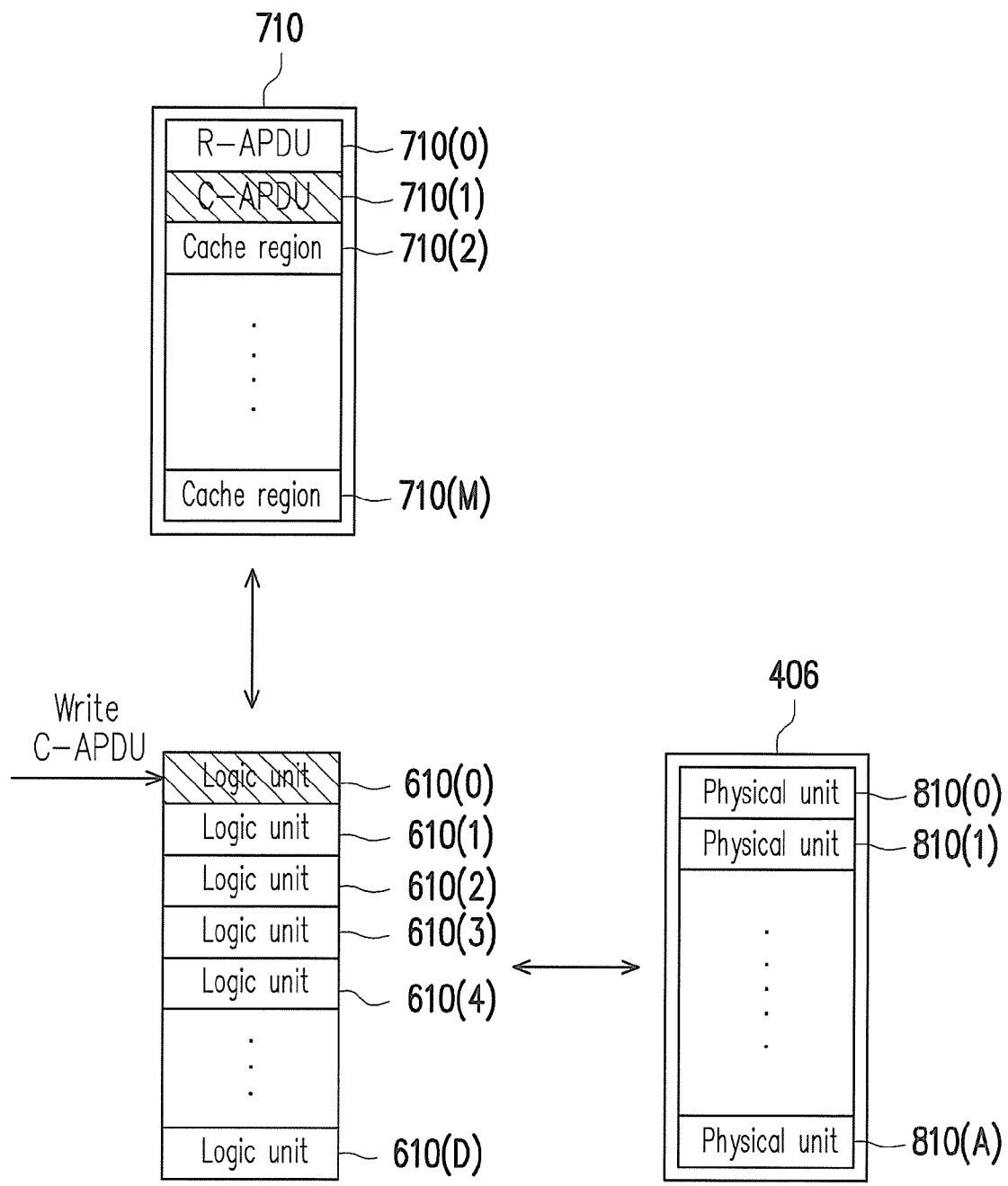

Referring to FIG. 8C, the host system 11 transmits an operation command sequence (also referred to as a first operation command sequence) corresponding to the first temporary file to the memory storage device 10. The first operation command sequence includes one or more program codes or command codes and is configured to instruct the smart card 408 to execute a specific operation (also referred to as a first operation). For instance, the first operation command sequence may include a C-APDU and be configured to write data in the first operation command sequence to the logic unit 610(0). Additionally, if it is assumed that the cache region 710(1) is configured to temporarily store data belonging to the logic unit 610(0), the data in the first operation command sequence may also be temporarily stored in the cache region 710(1).

After transmitting the first operation command sequence, the host system 11 (or the application 714) may execute a response reading operation corresponding to a certain temporary file at an arbitrary time point to read a response of the smart card 408 corresponding to the first operation. However, the host system 11 (or the application 714) may read an error response. For example, referring to FIG. 8B, if the host system 11 (or the application 714) executes a response reading operation corresponding to the second temporary file, the host system 11 (or the application 714) may read the "old" response belonging to the logic unit 610(1) that still exists in the cache memory 710. Thus, in the present exemplary embodiment, before executing the response reading operation, the host system 11 (or the application 714) executes a writing operation corresponding to one or more dummy files to attempt to clear or overwrite the "old" response in the cache region 710(0).

Figure 8D:
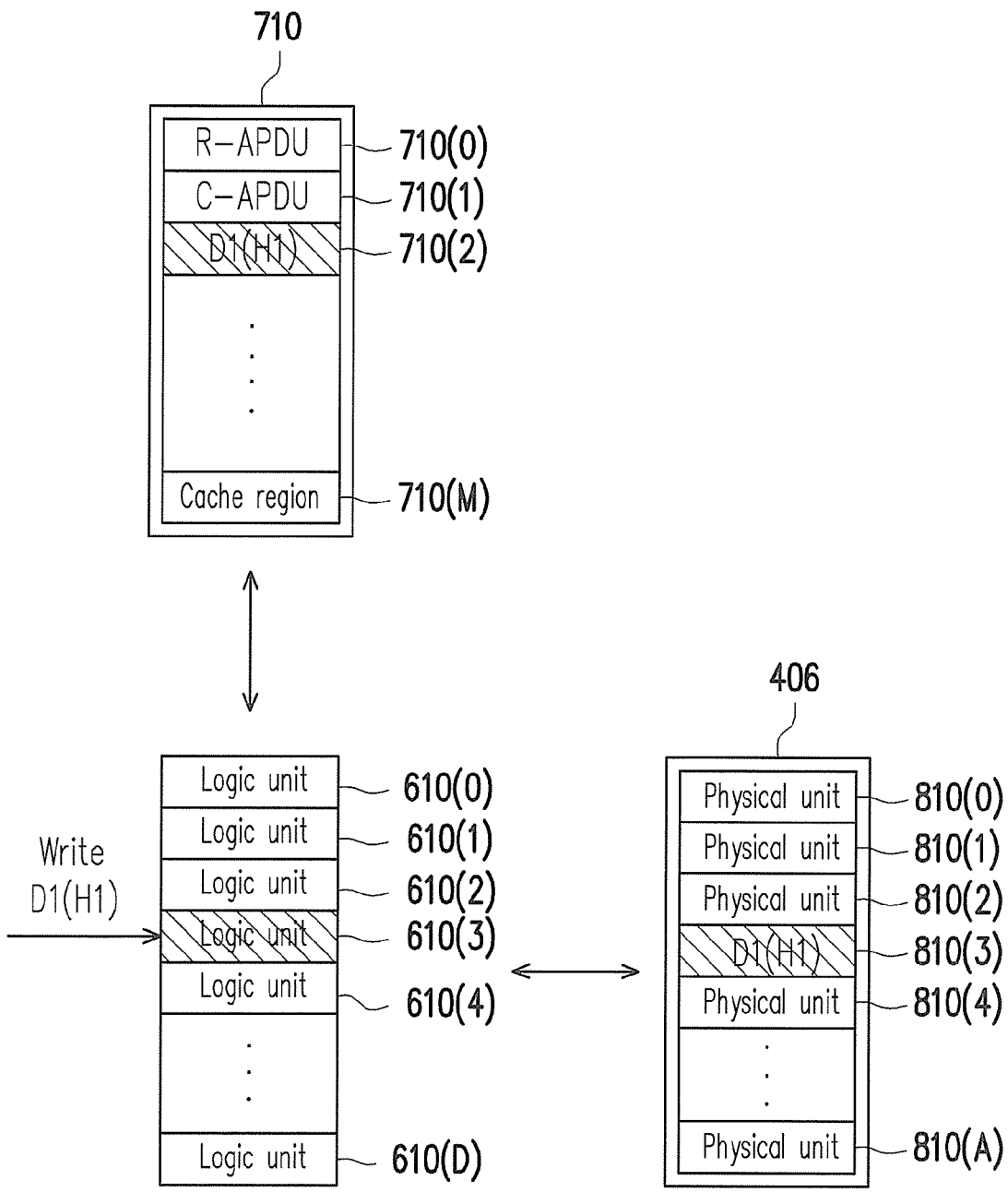

Referring to FIG. 8D, after transmitting the first operation command sequence, the host system 11 (or the application 714) executes a first writing operation corresponding to the first dummy file. The first writing operation is configured to update partial data (also referred to as first data) in the cache memory 710. For instance, the host system 11 transmits a write command sequence (also referred to as first write command sequence) to the memory storage device 10. The first write command sequence instructs to store data D1 (also referred to as first preset data) into the logic unit 610(3) corresponding to the first dummy file. Particularly, the data D1 includes an identification message H1 (also referred to as a first identification message). The identification message H1 is consistent with a preset identification message (also referred to as a first preset identification message). In the present exemplary embodiment, the identification message H1 being consistent with the first preset identification message indicates that the data content of the identification message H1 is identical to the data content of the first preset identification message. However, in another exemplary embodiment, the identification message H1 being consistent with the first preset identification message may also indicate that the data content of the identification message H1 which is processed by a logic operation (e.g., decoding or encrypting) is identical to the data content of the first preset identification message, which depends on demands of practical implementation. After receiving the first write command sequence, the memory management circuit 502 stores the data D1 into the rewritable non-volatile memory module 406. For instance, the memory management circuit 502 writes the data D1 into the physical units 810(3) mapped to the logic unit 610(3). Additionally, in correspondence to the first write command sequence, the data D1 is also temporarily stored in the cache region 710(2) of the cache memory 710 which is configured to temporarily store the data belonging to the logic unit 610(3).

Figure 8E:
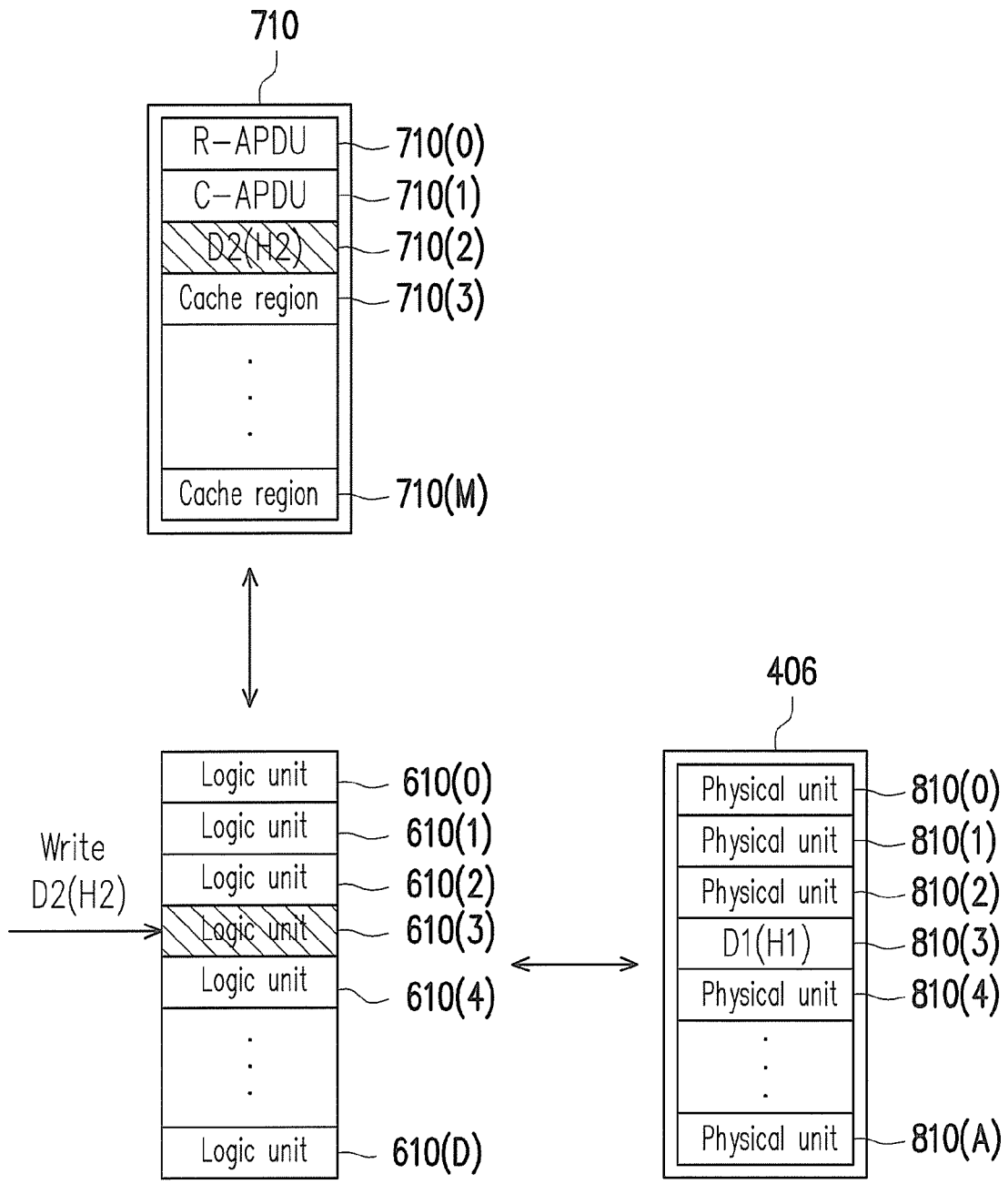

Referring to FIG. 8E, after transmitting the first write command sequence, the host system 11 (or the application 714) transmits another write command sequence (also referred to as a second write command sequence) to the memory storage device 10. The second write command sequence instructs to store data D2 (also referred to as second preset data) into the logic unit 610(3) corresponding to the first dummy file. Specially, the data D2 does not include the identification message H1. For instance, the data D2 may include an identification message H2 (also referred to as a second identification message) that is different from the identification message H1. The identification message H2 is inconsistent with the first preset identification message. For instance, the data content of the identification message H2 is different from the data content of the first preset identification message. Alternatively, the data content of the identification message H2 processed by a logic operation (e.g., decoding or encrypting) is different from the data content of the first preset identification message. It may be noted that after receiving the second write command sequence, the memory management circuit 502 does not store the data D2 into the rewritable non-volatile memory module 406. For instance, the memory management circuit 502 may ignore or directly discard the data D2. Additionally, in correspondence to the second write command sequence, the data D2 substitutes for the data D1 and is temporarily stored in the cache region 710(2).

After the data in the first dummy file is updated from the data D1 to the data D2, the host system 11 (or the application 714) may execute a reading operation (also referred to as first reading operation) corresponding to the first dummy file at an arbitrary time point. According to whether an identification message in data (also referred to as first read data) obtained by the first reading operation is consistent with the first preset identification message, the host system 11 (or the application 714) may determine whether to continuously update the data in the cache memory 710 or directly execute a response reading operation.

Figure 8F:
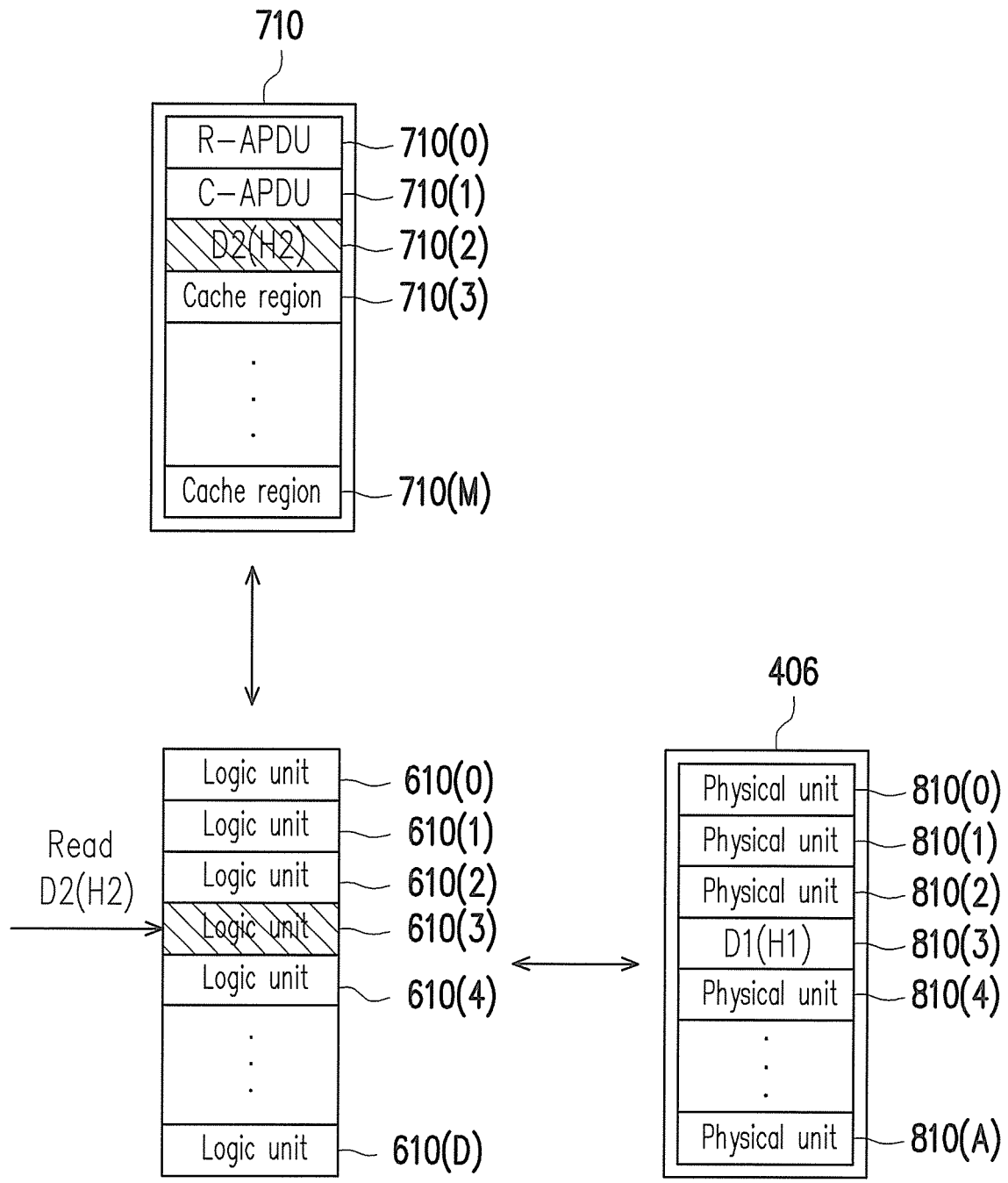

Referring to FIG. 8F, if it is assumed that the host system 11 (or the application 714) executes the first reading operation corresponding to the first dummy file immediately after transmitting the second write command sequence, the host system 11 (or the application 714) may directly read the data D2 belonging to the logic unit 610(3) from the cache region 710(2). In this case, the host system 11 (or the application 714) determines that the identification message H2 in the data D2 is inconsistent with the first preset identification message and continues to execute another writing operation (also referred to as second writing operation) corresponding to another dummy file.

Figure 8G:
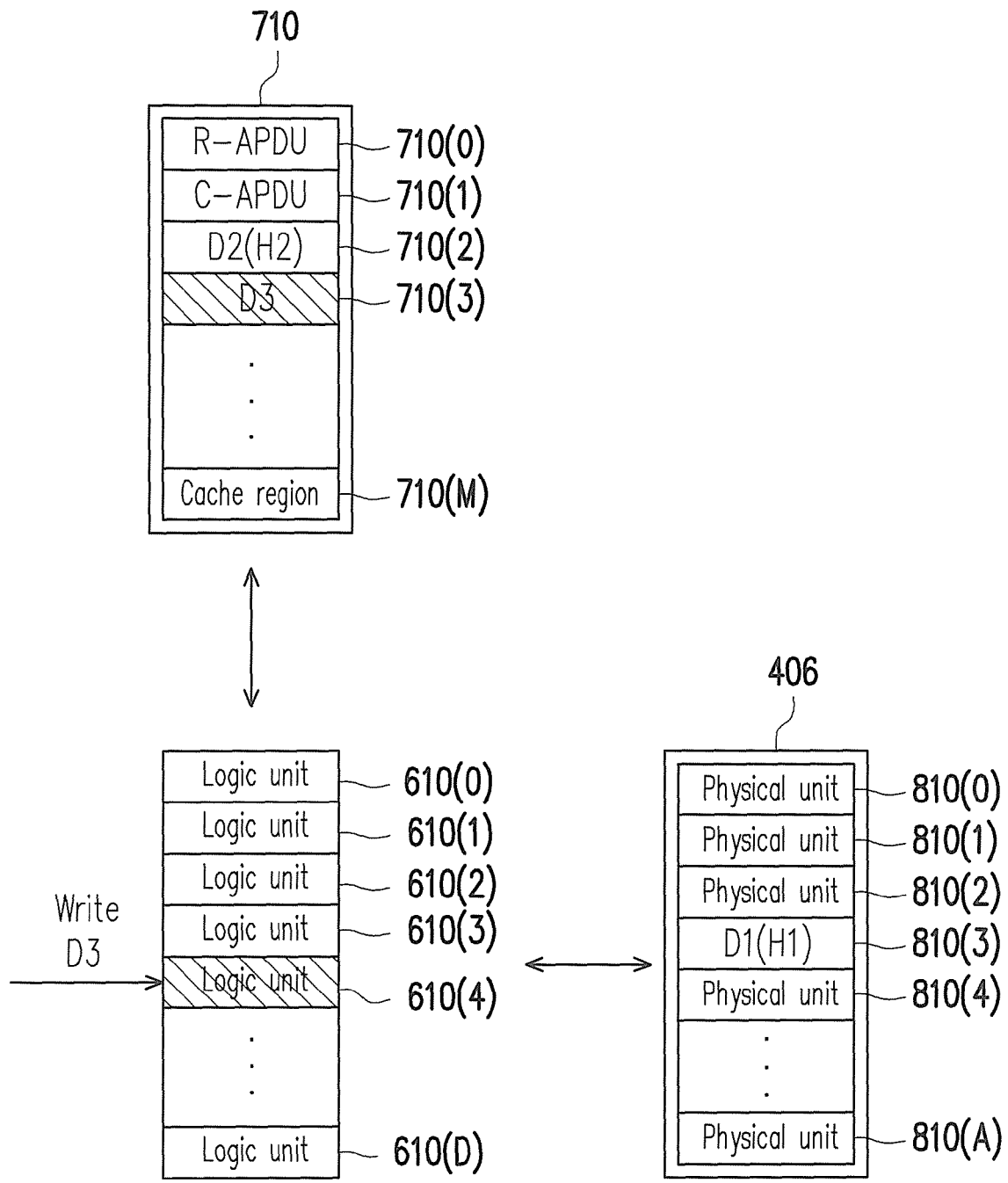

Referring to FIG. 8G, in response to the identification message in the first read data obtained by the first reading operation being inconsistent with the first preset identification message, the host system 11 (or the application 714) executes the second writing operation corresponding to the second dummy file to continuously update another data (also referred to as second data) in the cache memory 710. For instance, in the second writing operation, the host system 11 transmits a write command sequence to instruct to write data D3 into the logic unit 610(4) corresponding to the second dummy file. Meanwhile, the data D3 is also temporarily stored in the cache region 710(3) of the cache memory 710 which is configured to store the data belonging to the logic unit 610(4).

It may be noted that the logic units configured for the first dummy file and the second dummy file are different, and thus, the first writing operation executed corresponding to the first dummy file and the second writing operation executed corresponding to the second dummy file update different cache regions in the cache memory 710. The host system 11 (or the application 714) may continue to execute writing operations corresponding to different dummy files to update data belonging to different logic units in the cache memory 710. Additionally, the host system 11 (or the application 714) may execute the first reading operation corresponding to the first dummy file and the operation of determining of whether the identification message in the first read data is consistent with the first preset identification message as described in the exemplary embodiment FIG. 8F at an arbitrary time point, so as to determine whether the update of the cache memory 710 is sufficient. In other words, in the present exemplary embodiment, it is assumed that the data in the cache memory 710 is update in compliance with a first in first out (FIFO) rule. If the data obtained by the first reading operation is the data D1, it represents that the "old" data stored in the cache memory 710 before the first writing operation may be all cleared, and thus, the response reading operation executed hereinafter may read an actually "new" response from the smart card 408. If the data obtained by the first reading operation is the data D2, it represents that the old date stored in the cache memory 710 before the first writing operation may not be cleared completely, and thus, the "old" response may be probably read from the execution of the response reading operation.

Figure 8H:
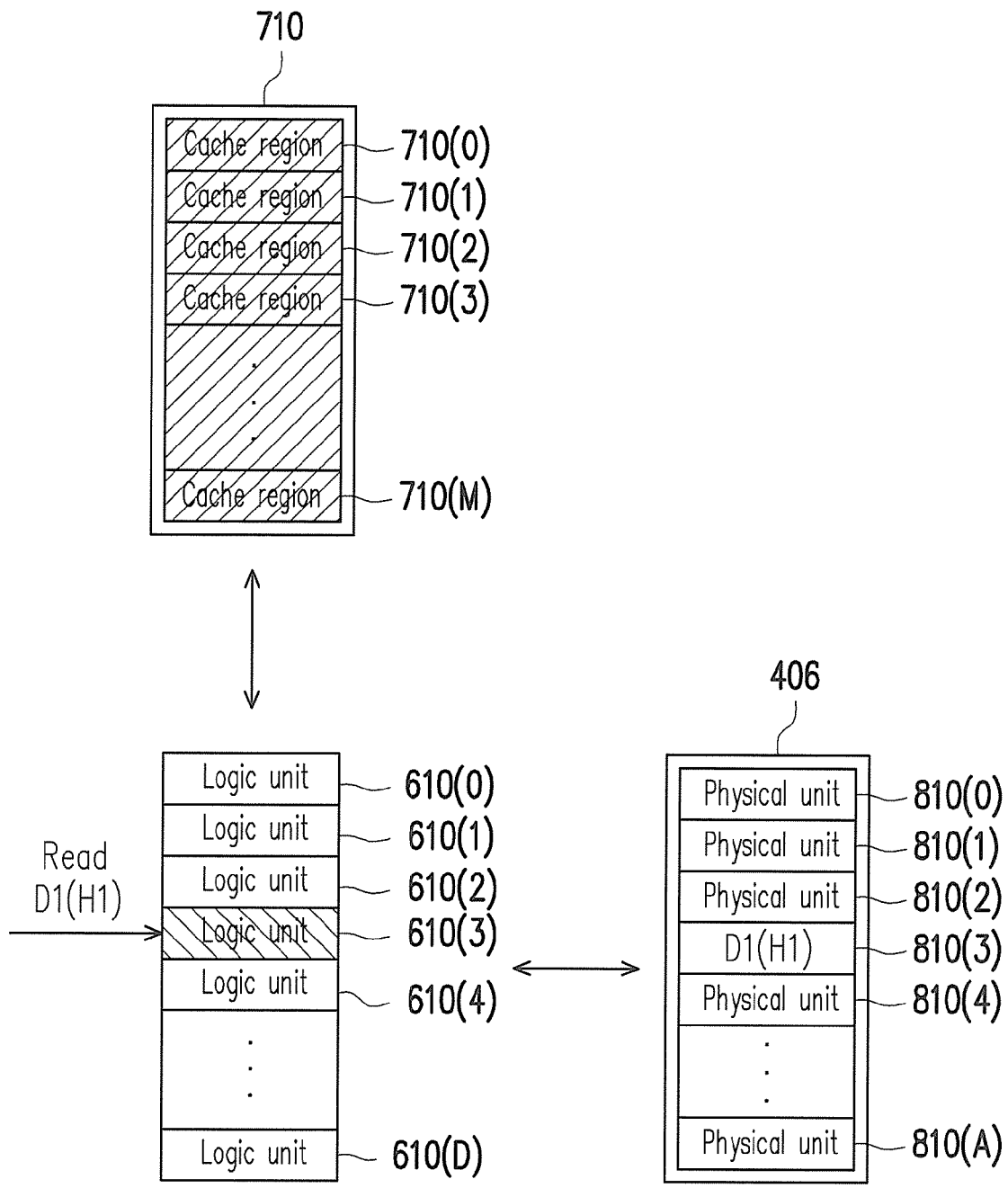

Referring to FIG. 8H, it is assumed that after the writing operations corresponding to one or more dummy files are executed, the data in the cache regions 710(0)-710(2) are overwritten by data belonging to other logic units. Afterwards, if the host system 11 (or the application 714) executes the first reading operation corresponding to the first dummy file as described in the exemplary embodiment of FIG. 8F, the host system 11 may transmit an actual read command sequence (also referred to as a first read command sequence) to the memory storage device 10 since the data belonging to the logic unit 610(3) no longer exists in the cache memory 710. The first read command sequence is configured to instruct to read the data stored in the logic unit 610(3). According to the first read command sequence, the memory storage device 10 transmits the data D1 from the physical unit 810(3) to the host system 11. After determining that the identification message H1 in the data D1 is consistent with the first preset identification message, the host system 11 (or the application 714) starts to read the response of the smart card 408 corresponding to the first operation.

Figure 8I:
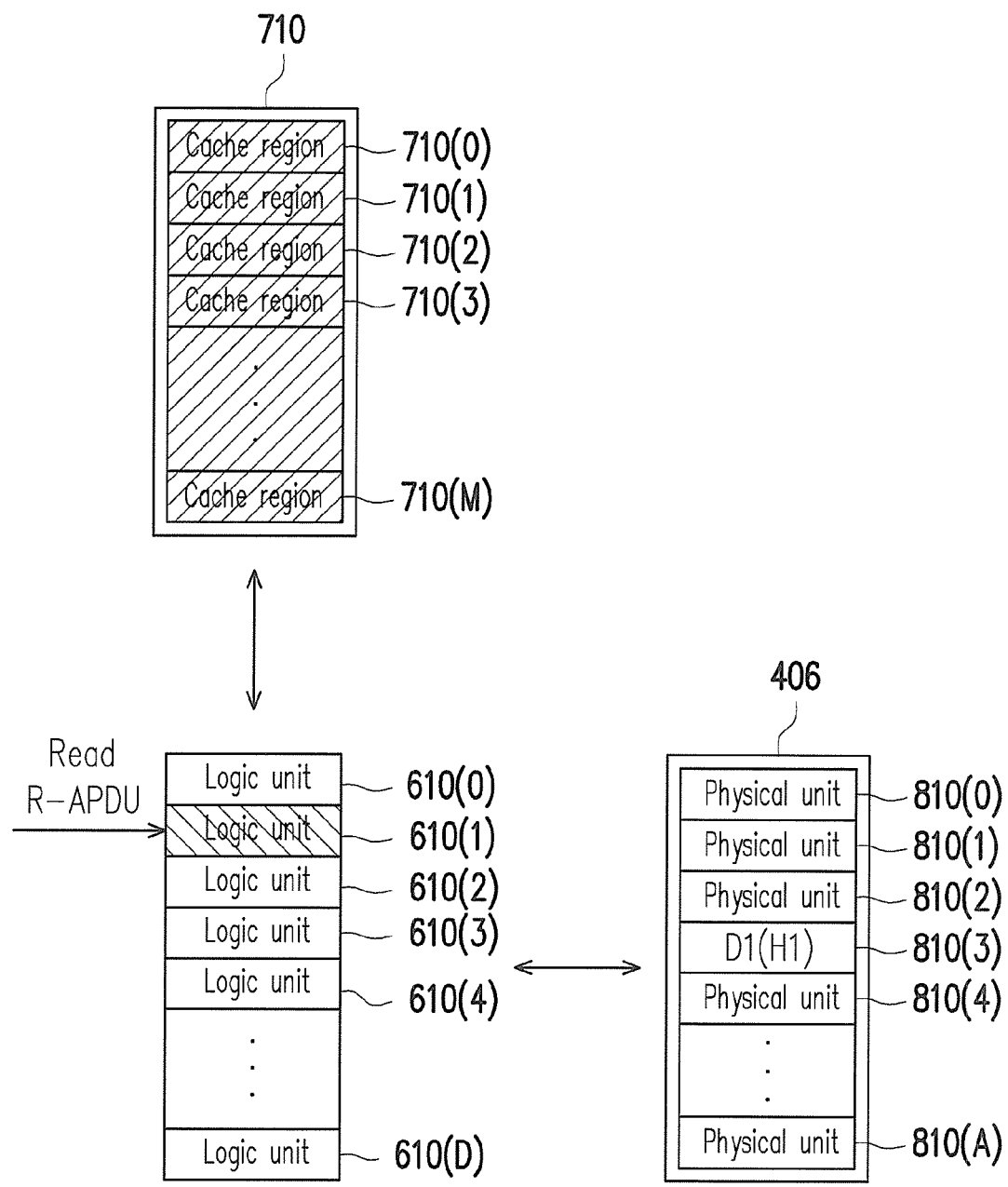

Referring to FIG. 8I, after determining that the identification message H1 in the obtained data D1 is consistent with the first preset identification message, the host system 11 (or the application 714) executes a response reading operation corresponding to a certain temporary file. For instance, the host system 11 (or the application 714) may execute a response reading operation corresponding to the second temporary file. In the response reading operation, the host system 11 may transmit an actual response read command sequence to the memory storage device 10 since the data (i.e., the "old" response) belonging to the logic unit 610(1) no longer exists in the cache memory 710. The response read command sequence instructs to read the data belonging to the logic unit 610(1). After receiving the response read command sequence, the memory storage device 10 transmits the response of the smart card 408 generated in correspondence to the first operation to the host system 11. In other words, in this case, the host system 11 (or the application 714) may obtain the "new" response of the smart card 408.

It may be noted that in the first exemplary embodiment, the host system 11 (or the application 714) respectively stores different data belonging to the same dummy file (or the same logic unit) into the cache memory 710 and the memory storage device 10. Accordingly, the host system 11 (or the application 714) may obtain an update status of the cache memory 710 according to whether the data obtained through reading the dummy file (or the logic unit) is from cache memory 710 or the memory storage device 10; and the host system 11 (or the application 714) may determine whether to perform the response reading operation accordingly. However, in another exemplary embodiment, the host system 11 (or the application 714) does not determine the time point for executing the response reading operation by utilizing the aforementioned mechanism. For instance, the host system 11 (or the application 714) may also add another identification message (also referred to as a third identification message) into the operation command sequence, so as to determining whether the currently received response is the "new" response or the "old" response accordingly.

Second Exemplary Embodiment

Figure 9A:
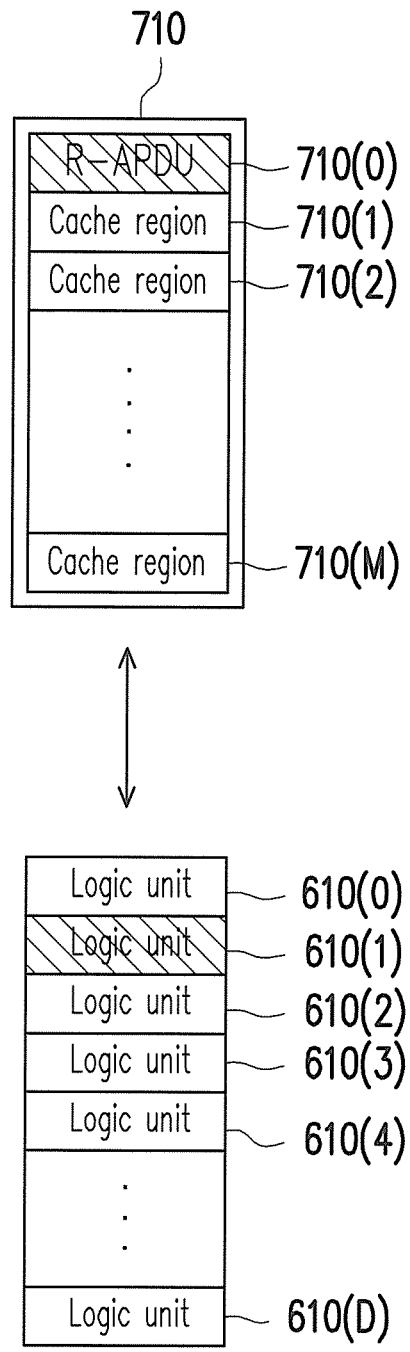
FIG. 9A to FIG. 9C are schematic diagrams of updating a cache and reading a response according to a second exemplary embodiment of the present invention.
Figure 9B:
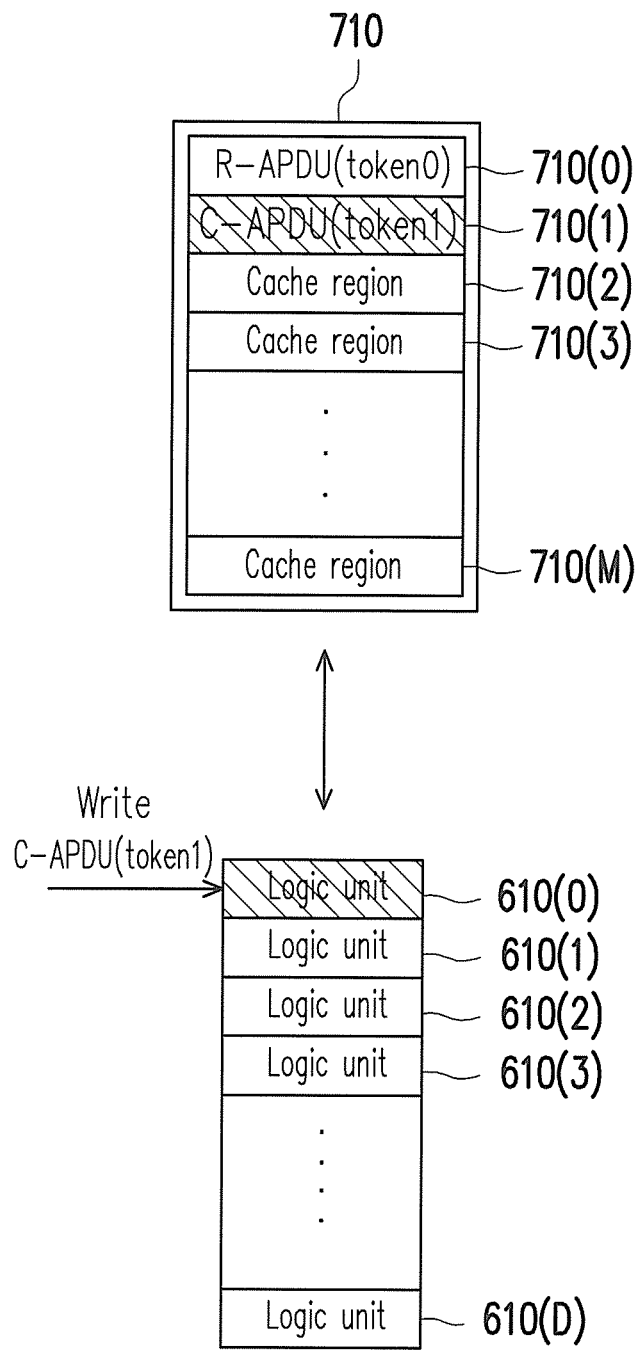
Figure 9C:
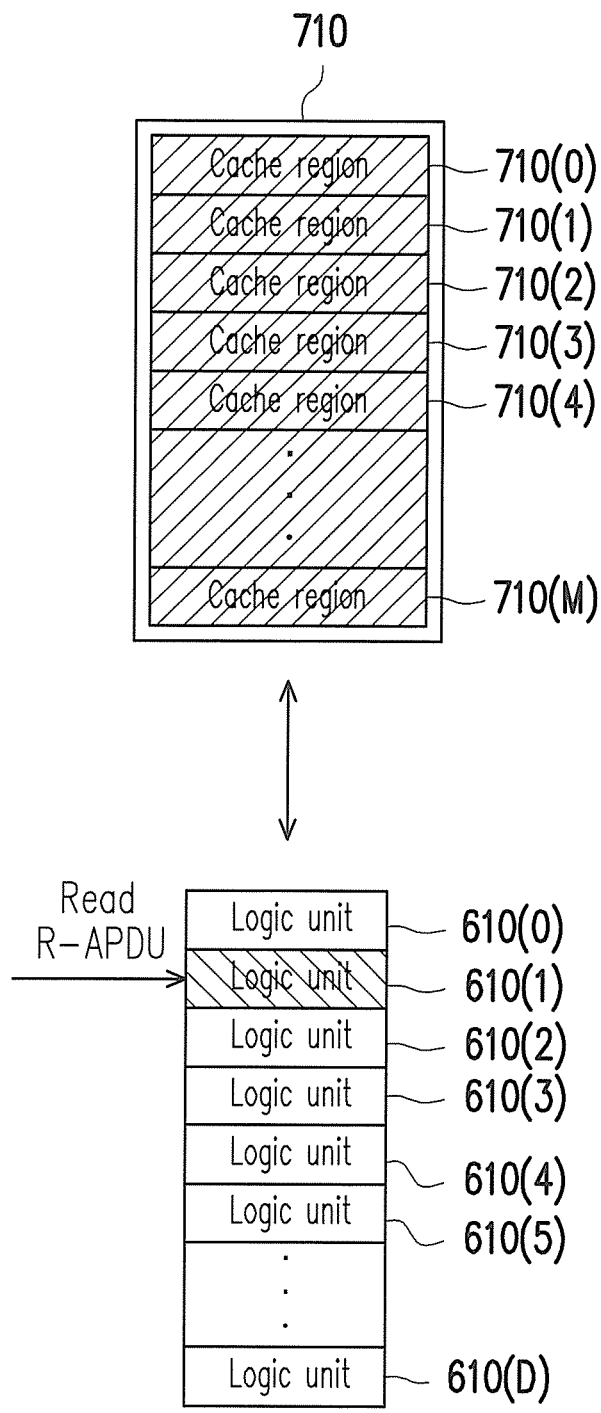

FIG. 9A to FIG. 9C are schematic diagrams of updating a cache and reading a response according to a second exemplary embodiment of the present invention. In the present exemplary embodiment, the description is also set forth with reference to the corresponding relationship between each file and each logic unit illustrated in FIG. 8A.

Referring to FIG. 9A, it is assumed that the cache region 710(0) stores data with respect to the "old" response belonging to the logic unit 610(1). Specially, in the present exemplary embodiment, the "old" response includes an "old" identification message token 0. The "old" identification message token 0 is used in an "old" C-APDU.

Referring to FIG. 9B, before transmitting the first operation command sequence corresponding to the first temporary file, the host system 11 (or the application 714) adds a "new" identification message token 1 into the first operation command sequence. The identification message token 1 is, for example, added into a command header of the first operation command sequence. The "new" identification message token 1 and the "old" identification message token 0 are different. Additionally, the "new" identification message token 1 is consistent with a preset identification message (also referred to as a second preset identification message). Afterwards, the host system 11 transmits the first operation command sequence containing the identification message token 1 to the memory storage device 10. The first operation command sequence is configured to instruct the smart card 408 to execute a first operation. For instance, the first operation command sequence may include a C-APDU and be configured to instruct to write the data in the first operation command sequence into the logic unit 610(0). Additionally, if it is assumed that the cache region 710(1) is configured to temporarily store the data belonging to the logic unit 610(0), the data containing the identification message token 1 in the first operation command sequence is also temporarily stored in the cache region 710(1).

In the present exemplary embodiment, when the memory storage device 10 receives the first operation command sequence, the memory management circuit 502 records the identification message token 1 of the first operation command sequence and instructs the smart card 408 to execute the corresponding operation according to the first operation command sequence. After a response generated by the smart card 408 corresponding to the first operation command sequence, the memory management circuit 502 adds the identification message token 1 corresponding to the first operation command sequence in the response and waits for the host system 11 to read the response.

On the other hand, after transmitting the first operation command sequence, the host system 11 (or the application 714) may execute the response reading operation at an arbitrary time point to read the response of the smart card 408 corresponding to the first operation command sequence. However, if the "old" response is still stored in the cache memory 710, the "old" response may be read by the response reading operation, which causes a read error to the response. For instance, referring to FIG. 9B, since the "old" response belonging to the logic unit 610(1) is stilled stored in the cache region 710(0), the "old" response in the cache region 710(0) may be read by the host system 11 (or the application 714) through reading the logic unit 610(1) corresponding to the second temporary file. Thus, in the similar way of the first exemplary embodiment, before executing the response reading operation, the host system 11 (or the application 714) may execute writing operations corresponding to one or more dummy files to update the date in the cache memory 710. Detail regarding how to execute the writing operation corresponding to the dummy files (e.g., the first dummy file and/or the second dummy file) to update the data in the cache memory 710 has been described in the first exemplary embodiment and thus, will not be repeated hereinafter.

After receiving the response data obtained by the response reading operation, the host system 11 (or the application 714) determines whether an identification message in the response data is consistent with the second preset identification message. If the identification message in the response data is consistent with the second preset identification message, it indicates that the response is the "new" response generated by the smart card 408 corresponding to the first operation command sequence. If the identification message in the response data is inconsistent with the second preset identification message, it indicates that the response is the "old" response in the cache memory 710. For instance, in the exemplary embodiment illustrated in FIG. 9B, since the "old" response belonging to the logic unit 610(1) is still stored in the cache region 710(0), the "old" response containing the identification message token 0 may be read by the host system 11 (or the application 714) from the cache region 710(0) through reading the logic unit 610(1). In this case, since the identification message token 0 is inconsistent with the second preset identification message (i.e., token 1), the host system 11 (or the application 714) determines to continue to execute the writing operation corresponding to another dummy file to continuously update the data in the cache memory 710. In other words, updating the data in the cache memory 710 aims at clearing the data in the cache memory 710 that may cause any subsequent read error (e.g., the "old" response in the cache region 710(0)).

Referring to FIG. 9C, it is assumed that after the writing operations corresponding to a plurality of dummy files are executed, the data with respect to the "old" response in the cache region 710(0) is overwritten by the data belonging to another logic unit. Afterwards, if the host system 11 (or the application 714) executes a response reading operation (i.e., reads the data belonging to the logic unit 610(1)) corresponding to the second temporary file, the host system 11 transmits a response read command sequence to the memory storage device 10 since the data belonging to the logic unit 610(1) no longer exists in the cache memory 710. Thus, according to the response read command sequence, the memory management circuit 502 transmits a response containing the identification message token 1 to the host system 11. Since the identification message token 1 is consistent with the second preset identification message, the host system 11 (or the application 714) determines that the response containing the identification message token 1 is a "new" response generated by the smart card 408 corresponding to the first operation command sequence.

It may be noted that the present invention is not intent to limit the time point for executing the writing operation corresponding to a certain dummy file in the aforementioned first and second exemplary embodiments. For instance, in another exemplary embodiment, the writing operations corresponding to one or more dummy files may also be executed before the first operation command sequence corresponding to the first temporary file is transmitted. For instance, the writing operations corresponding to one or more dummy files may be executed in response to the host system 11 (or the application 714) being about to transmit the first operation command sequence. Alternatively, in another exemplary embodiment, the writing operations corresponding to one or more dummy files may also be executed after a certain response from the smart card 408 is read by the host system 11 (or the application 714). For instance, the writing operations corresponding to one or more dummy files may be executed in response to a certain response from the smart card 408 being read by the host system 11 (or the application 714). Additionally, in other exemplary embodiments, the writing operation corresponding to a certain dummy file may be executed when the data related to the smart card 408 or any other data stored in the cache memory 710 requires to be updated, but the present invention is not limited thereto. Or, in an exemplary embodiment, the writing operation corresponding to the a certain dummy file may be executed after the host system 11 or the memory storage device 10 is just turned on, before the host system 11 or the memory storage device 10 is turned on, or when the host system 11 or the memory storage device 10 is idle for more than a preset time.

In an exemplary embodiment, the host system 11 (or the application 714) may also add an additional identification message into a write command sequence instructing to store specific data in a logic unit corresponding to a certain dummy file. Therein, the additional identification message serves as a basis on which whether to store data in the write command sequence is determined. For instance, the additional identification message may be added into a command header of a write command sequence. When the memory management circuit 502 receives a write command sequence containing an identification message (also referred to as a fourth identification message) consistent with an additional identification message (also referred to as a third preset identification message), the memory management circuit 502 stores data which is instructed to, by the write command sequence, be stored in the rewritable non-volatile memory module 406. Otherwise, when the memory management circuit 502 receives a write command sequence instructing to store specific data in a logic unit corresponding to a certain dummy file, and the write command sequence does not contain the additional identification message consistent with the third preset identification message (for example, the write command sequence contains a fifth identification message inconsistent with the third preset identification message), the memory management circuit 502 does not store the data indicated by the write command sequence into the rewritable non-volatile memory module 406. For instance, in the exemplary embodiment illustrated in FIG. 8D, the fourth identification message consistent with the third preset identification message may be added into the first write command sequence, the memory management circuit 502 may store the data D1 in the rewritable non-volatile memory module 406 based on the identification message (i.e., the fourth preset identification message) contained in the first write command sequence being consistent with the third preset identification message. Moreover, in the exemplary embodiment illustrated in FIG. 8E, the fifth identification message inconsistent with the third preset identification message may be added into the second write command sequence, and the memory management circuit 502 may not store the data D2 in the rewritable non-volatile memory module 406 based on the identification message (i.e., the fifth identification message) contained in the second write command sequence being inconsistent with the third preset identification message. Additionally, in another exemplary embodiment illustrated in FIG. 8D and FIG. 8E, the fourth identification message may also be replaced by the first identification message contained in the data to be stored, and the third preset identification message may also be replaced by the first preset identification message. For instance, in an exemplary embodiment of FIG. 8D, after receiving the first write command sequence, the memory management circuit 502 may determine to store the data D1 to the rewritable non-volatile memory module 406 according to the identification message H1 in the data D1 being consistent with the first preset identification message. For instance, in an exemplary embodiment of FIG. 8E, after receiving the second write command sequence, the memory management circuit 502 may determine not to store the data D2 in the rewritable non-volatile memory module 406 according to the identification message H2 in the data D2 being inconsistent with the first preset identification message.

In another exemplary embodiment, the host system 11 (or the application 714) may determine whether to "actually" store the data into the rewritable non-volatile memory module 406 in the writing operation corresponding to a dummy file according to whether the dummy file is existing. The term "existing" refers to existing in the file system of the host system 11. Additionally, if a specific dummy file is existing, at least one physical unit mapped to the logic unit corresponding to the dummy file is generally already configured in the rewritable non-volatile memory module 406. For instance, in the writing operation corresponding to a specific dummy file, the host system 11 (or the application 714) may determine whether the dummy file is existing. If the dummy file is not existing, the host system 11 (or the application 714) establishes the dummy file (e.g., in the file system of the host system 11) and adds the fourth identification message consistent with the third preset identification message into a write command sequence (also referred to as a third write command sequence) to be transmitted. The third write command sequence instructs to write certain data (also referred to as third preset data) into a logic unit corresponding to the dummy file. When receiving the third write command sequence, the memory management circuit 502 selects a physical unit from the rewritable non-volatile memory module 406 and stores the third preset data in the physical unit in response to the fourth identification message in the third write command sequence being consistent with the third preset identification message. Otherwise, if the dummy file is already existing, the host system 11 (or the application 714) transmits a write command sequence (also referred to as a fourth write command sequence) containing no identification message consistent with the third preset identification message to the memory storage device 10. For instance, the fourth write command sequence includes the fifth identification message. When receiving the fourth write command sequence, the memory management circuit 502 stores data (also referred to as fourth preset data) which is instructed by the fourth write command sequence to be stored into the rewritable non-volatile memory module 406 in response to the fifth identification message in the fourth write command sequence being inconsistent with the third preset identification message. The third write command sequence or the fourth write command sequence referred to herein may be applied in the writing operation corresponding to the arbitrary dummy file of the first and the second exemplary embodiments. Additionally, in another exemplary embodiment, the fourth identification message which is added in response to the absence of the dummy file may also be replaced by the first identification message contained in the data to be stored, and the third preset identification message may also be replaced by the first preset identification message. Thereby, the memory management circuit 502 may determine whether to store the corresponding data according to the identification message contained in the data to be stored. Detail regarding to how the memory management circuit 502 determines whether to store the corresponding data according to the identification message contained in the data to be stored has been described above and thus, will not be repeated.

In an exemplary embodiment, the host system 11 (or the application 714) may also estimate the capacity of the cache memory 710 according to the number of the used dummy files and the size of each dummy file. For instance, corresponding to execution of the writing operations corresponding to N dummy files, the host system 11 (or the application 714) may estimate that the capacity of the cache memory 710 is less than or equal to the size of the N dummy files. In this way, before executing the response reading operation, data may be synchronously or continuously written into the N dummy files to accelerate the speed of updating the cache memory 710. Alternatively, in another exemplary embodiment, after the capacity of the cache memory 710 is obtained, the size of a subsequently used dummy file may be determined or changed. For instance, if the capacity of the cache memory 710 is less than or equal to the size of the N dummy files, the host system 11 (or the application 714) may also directly select a specific dummy file with a size approximate to the size of the N dummy files for executing the writing operation to reduce the number of times for executing the writing operations. Additionally, if the host system 11 (or the application 714) determines that the size of a dummy file in use may be too large, the size of the dummy file may be adaptively reduced to save memory spaces.

Figure 10:
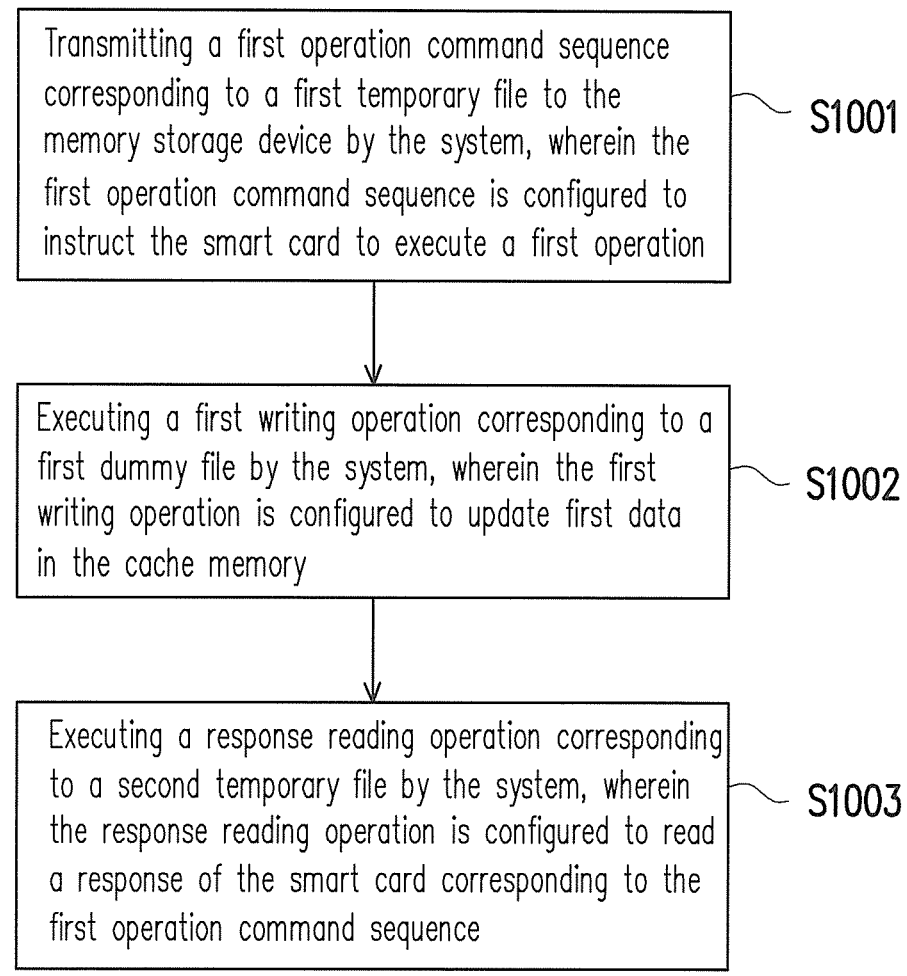
FIG. 10 is a flowchart of a response reading method according to an exemplary embodiment of the present invention.

FIG. 10 is a flowchart of a response reading method according to an exemplary embodiment of the present invention.

Referring to FIG. 10, in step S1001, the system transmits a first operation command sequence corresponding to a first temporary file to the memory storage device, wherein the first operation command sequence is configured to instruct the smart card to execute a first operation. In step S1002, the system executes the first writing operation corresponding to the first dummy file, wherein the first writing operation is configured to update first data in the cache memory. In step S1003, the system executes a response reading operation corresponding to a second temporary file, wherein the response reading operation is configured to read a response of the smart card corresponding to the first operation command sequence.

Nevertheless, each step in FIG. 10 has been described in detail above and thus, will not be repeated hereinafter. It may be noted that each step illustrated in FIG. 10 may also be implemented as a plurality of program codes or circuits, and the present invention is not limited thereto. Additionally, the method illustrated in FIG. 10 may also be operated with the exemplary embodiments above or may be solely used, which is not limited in the present invention.

To summarize, the writing operations corresponding to the dummy files using different logic units are executed, and thereby, the present invention can facilitate in effectively excluding the old data from the cache memory in the host system. In this way, the probability of the host system reading the "accurate" response messages from the smart card can be increased. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A response reading method, adapted for data transmission between a system and a memory storage device, wherein the system has a cache memory, and the memory storage device has a smart card and a rewritable non-volatile memory module, the response reading method comprising:
    transmitting a first operation command sequence corresponding to a first temporary file to the memory storage device by the system, wherein the first operation command sequence is configured to instruct the smart card to execute a first operation;
    executing a first writing operation corresponding to a first dummy file by the system, wherein the first writing operation is configured to update first data in the cache memory; and
    executing a response reading operation corresponding to a second temporary file by the system, wherein the response reading operation is configured to read a response of the smart card corresponding to the first operation command sequence.

2. The response reading method according to claim 1, wherein before the step of executing the response reading operation corresponding to the second temporary file by the system, the response reading method further comprises:
    executing a first reading operation corresponding to the first dummy file by the system;
    determining, by the system, whether an identification message in first read data obtained by the first reading operation is consistent with a first preset identification message; and
    if the identification message in the first read data is inconsistent with the first preset identification message, executing a second writing operation corresponding to a second dummy file by the system, wherein the second writing operation is configured to update second data in the cache memory, wherein the first dummy file and the second dummy file are different.

3. The response reading method according to claim 2, wherein the step of executing the first writing operation corresponding to the first dummy file by the system comprises:
    transmitting a first write command sequence to the memory storage device by the system, wherein the first write command sequence instructs to write first preset data into a first logic unit corresponding to the first dummy file, wherein the first preset data comprises a first identification message consistent with the first preset identification message; and transmitting a second write command sequence to the memory storage device by the system, wherein the second write command sequence instructs to write second preset data into the first logic unit, the second preset data comprises a second identification message inconsistent with the first preset identification message, wherein the second preset data is configured to replace the first preset data temporarily stored in the cache memory.

4. The response reading method according to claim 3, wherein the step of executing the first reading operation corresponding to the first dummy file by the system comprises:

transmitting a first read command sequence to the memory storage device by the system, wherein the first read command sequence is configured to read the first preset data stored in the first logic unit.

5. The response reading method according to claim 3, further comprising:

receiving the first write command sequence and storing the first preset data into the rewritable non-volatile memory module by the memory storage device; and receiving the second write command sequence and not storing the second preset data into the rewritable non-volatile memory module by the memory storage device.

6. The response reading method according to claim 2, wherein the step of executing the response reading operation corresponding to the second temporary file by the system is performed after determining, by the system, that the identification message in the first read data is consistent with the first preset identification message.

7. The response reading method according to claim 1, wherein the step of executing the response reading operation corresponding to the second temporary file by the system comprises:

determining, by the system, whether an identification message in response data obtained by the response reading operation is consistent with a second preset identification message, wherein the step of executing the first writing operation corresponding to the first dummy file by the system is performed after determining, by the system, that the identification message in the response data is inconsistent with the second preset identification message.

8. The response reading method according to claim 7, wherein the first operation command sequence comprises a third identification message consistent with the second preset identification message, and the reading response method further comprises:

receiving the first operation command sequence and recording the third identification message in the first operation command sequence by the memory storage device; and adding the third identification message into the response of the smart card corresponding to the first operation command sequence by the memory storage device.

9. The response reading method according to claim 1, wherein the step of executing the first writing operation corresponding to the first dummy file by the system comprises:

determining, by the system, whether the first dummy file exists;

if the first dummy file does not exist, establishing the first dummy file and transmitting a third write command sequence to the memory storage device by the system, wherein the third write command sequence instructs to write third preset data into a first logic unit corresponding to the first dummy file, and the third write command sequence comprises a fourth identification message consistent with a third preset identification message; and if the first dummy file exists, transmitting a fourth write command sequence to the memory storage device by the system, wherein the fourth write command sequence instructs to write fourth preset data into the first logic unit, and the fourth write command sequence comprises a fifth identification message inconsistent with the third preset identification message.

10. The response reading method according to claim 9, further comprising:

receiving the third write command sequence and storing the third preset data into the rewritable non-volatile memory module by the memory storage device; and receiving the fourth write command sequence and not storing the fourth preset data into the rewritable non-volatile memory module by the memory storage device.

11. A data transmission system, comprising:

a system, comprising a cache memory; and a memory storage device, comprising a connection interface unit, a memory control circuit unit, a rewritable non-volatile memory module and a smart card, wherein the connection interface unit is configured to couple to the system, the memory control circuit unit is coupled to the connection interface unit, wherein the rewritable non-volatile memory module and the smart card are respectively coupled to the memory control circuit unit, wherein the system is configured to transmit a first operation command sequence corresponding to a first temporary file to the memory storage device, and the first operation command sequence is configured to instruct the smart card to execute a first operation, wherein the system is further configured to execute a first writing operation corresponding to a first dummy file, wherein the first writing operation is configured to update first data in the cache memory, wherein the system is further configured to execute a response reading operation corresponding to a second temporary file, wherein the response reading operation is configured to read a response of the smart card corresponding to the first operation command sequence.

12. The data transmission system according to claim 11, wherein the system is further configured to execute a first reading operation corresponding to the first dummy file before the system executes the response reading operation corresponding to the second temporary file, wherein the system is further configured to determine whether an identification message in the first read data obtained by the first reading operation is consistent with a first preset identification message, wherein if the identification message in the first read data is inconsistent with the first preset identification message, the system is further configured to execute a second writing operation corresponding to a second dummy file, wherein the second writing operation is configured to update second data in the cache memory, wherein the first dummy file and the second dummy file are different.

13. The data transmission system according to claim 12, wherein the operation of the system executing the first writing operation corresponding to the first dummy file comprises:

transmitting a first write command sequence to the memory storage device, wherein the first write command sequence instructs to write first preset data into a first logic unit corresponding to the first dummy file, and the first preset data comprises a first identification message consistent with the first preset identification message; and transmitting a second write command sequence to the memory storage device, wherein the second write command sequence instructs to write second preset data into the first logic unit, the second preset data comprises a second identification message inconsistent with the first preset identification message, and the second preset data is configured to replace the first preset data temporarily stored in the cache memory.

14. The data transmission system according to claim 13, wherein the operation of the system executing the first reading operation corresponding to the first dummy file comprises:

transmitting a first read command sequence to the memory storage device, wherein the first read command sequence is configured to read the first preset data stored in the first logic unit.

15. The data transmission system according to claim 13, wherein the memory control circuit unit is configured to receive the first write command sequence and store the first preset data into the rewritable non-volatile memory module, wherein the memory control circuit unit is further configured to receive the second write command sequence and not store the second preset data into the rewritable non-volatile memory module.

16. The data transmission system according to claim 12, wherein the system executes the response reading operation corresponding to the second temporary file after determining that the identification message in the first read data is consistent with the first preset identification message.

17. The data transmission system according to claim 11, wherein the operation of the system executing the response reading operation corresponding to the second temporary file comprises:

determining whether an identification message in response data obtained by the response reading operation is consistent with a second preset identification message, wherein the system executes the first writing operation corresponding to the first dummy file after determining that the identification message in the response data is inconsistent with the second preset identification message.

18. The data transmission system according to claim 17, wherein the first operation command sequence comprises a third identification message consistent with the second preset identification message wherein the memory control circuit unit is configured to receive the first operation command sequence and record the third identification message in the first operation command sequence, wherein the memory control circuit unit is further configured to add the third identification message into the response of the smart card corresponding to the first operation command sequence.

19. The data transmission system according to claim 11, wherein the operation of the system executing the first writing operation corresponding to the first dummy file comprises:

determining whether the first dummy file exists;

if the first dummy file does not exist, establishing the first dummy file and transmitting a third write command sequence to the memory storage device, wherein the third write command sequence instructs to write third preset data into a first logic unit corresponding to the first dummy file, wherein the third write command sequence comprises a fourth identification message consistent with a third preset identification message; and if the first dummy file exists, transmitting a fourth write command sequence to the memory storage device, wherein the fourth write command sequence instructs to write fourth preset data into the first logic unit, and the fourth write command sequence comprises a fifth identification message inconsistent with the third preset identification message.

20. The data transmission system according to claim 19, wherein the memory control circuit unit is further configured to receive the third write command sequence and store the third preset data in the rewritable non-volatile memory module, wherein the memory control circuit unit is further configured to receive the fourth write command sequence and not store the fourth preset data in the rewritable non-volatile memory module.

* * * * *